United States Patent
Chen et al.

(10) Patent No.: US 10,606,028 B2
(45) Date of Patent: Mar. 31, 2020

(54) WIDE-ANGLE LENS ASSEMBLY

(71) Applicants: Sintai Optical (Shenzhen) Co., Ltd., ShenZhen, Guandong Province (CN); Asia Optical Co., Inc., Taichung (TW)

(72) Inventors: Yuan-Chen Chen, Taichung (TW); Ming-Huang Tseng, Taichung (TW); Hsi-Ling Chang, Taichung (TW); Chien-Hung Chen, Taichung (TW)

(73) Assignees: SINTAI OPTICAL (SHENZHEN) CO., LTD., Shenzhen, Guandong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 15/859,848

(22) Filed: Jan. 2, 2018

(65) Prior Publication Data
US 2018/0329177 A1 Nov. 15, 2018

(30) Foreign Application Priority Data
May 9, 2017 (CN) .......................... 2017 1 0319694

(51) Int. Cl.
| | | |
|---|---|---|
| G02B 9/62 | (2006.01) | |
| G02B 13/18 | (2006.01) | |
| G02B 13/00 | (2006.01) | |
| G02B 13/04 | (2006.01) | |

(52) U.S. Cl.
CPC ............. *G02B 9/62* (2013.01); *G02B 13/002* (2013.01); *G02B 13/0045* (2013.01); *G02B 13/04* (2013.01)

(58) Field of Classification Search
CPC ....... G02B 13/04; G02B 13/0045; G02B 9/62
USPC .................................. 359/713, 752, 756, 770
See application file for complete search history.

(56) References Cited

U.S. PATENT DOCUMENTS

2016/0178871 A1* 6/2016 You .................... G02B 13/0045
                                                                    359/713
2018/0314039 A1* 11/2018 Dai .......................... G02B 9/64

* cited by examiner

*Primary Examiner* — William Choi
(74) *Attorney, Agent, or Firm* — McClure, Qualey & Rodack, LLP

(57) ABSTRACT

A wide-angle lens assembly includes a first lens, a second lens, a third lens, a fourth lens, a fifth lens, and a sixth lens. The first lens is with negative refractive power and includes a convex surface facing an object side and a concave surface facing an image side. The second lens is with positive refractive power. The third lens is with positive refractive power and includes a convex surface facing the object side. The fourth lens is with negative refractive power. The fifth lens is with positive refractive power and includes a convex surface facing the image side. The sixth lens is with negative refractive power. The wide-angle lens assembly satisfies: $-1.5 < f_5/f \le -0.77$, wherein $f_1$ is an effective focal length of the first lens and $f_5$ is an effective focal length of the fifth lens.

21 Claims, 24 Drawing Sheets

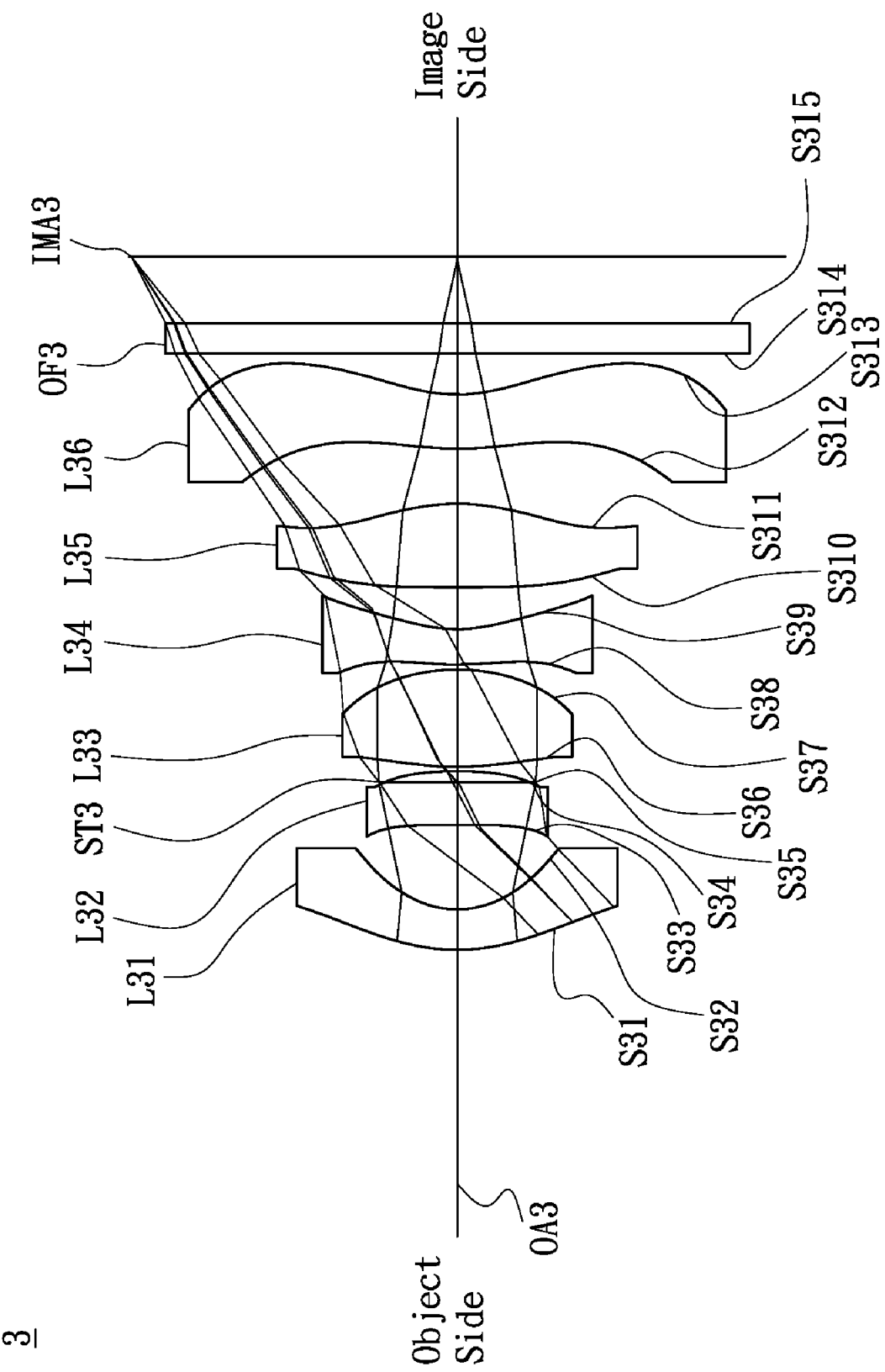

WIDE-ANGLE LENS ASSEMBLY

BACKGROUND OF THE INVENTION

Field of the Invention

The invention relates to a wide-angle lens assembly.

Description of the Related Art

The current development trend of a wide-angle lens assembly is toward miniaturization. Additionally, the wide-angle lens assembly is developed to have large field of view and high resolution capability in accordance with different application requirements. However, the known wide-angle lens assembly can't satisfy such requirements. Therefore, the wide-angle lens assembly needs a new structure in order to meet the requirements of miniaturization, large field of view, and high resolution at the same time.

BRIEF SUMMARY OF THE INVENTION

The invention provides a wide-angle lens assembly to solve the above problems. The wide-angle lens assembly of the invention is provided with characteristics of a shortened total lens length, a larger field of view, a higher resolution, and still has a good optical performance.

The wide-angle lens assembly in accordance with an exemplary embodiment of the invention includes a first lens, a second lens, a third lens, a fourth lens, a fifth lens, and a sixth lens, wherein the first lens, the second lens, the third lens, the fourth lens, the fifth lens, and the sixth lens are arranged in order from an object side to an image side along an optical axis. The first lens is with negative refractive power and includes a convex surface facing the object side and a concave surface facing the image side. The second lens is with positive refractive power. The third lens is with positive refractive power and includes a convex surface facing the object side. The fourth lens is with negative refractive power. The fifth lens is with positive refractive power and includes a convex surface facing the image side. The sixth lens is with negative refractive power. The wide-angle lens assembly satisfies: $-1.5 < f_5/f_1 \leq -0.77$, wherein $f_1$ is an effective focal length of the first lens and $f_5$ is an effective focal length of the fifth lens.

In another exemplary embodiment, the second lens includes a concave surface facing the object side and a convex surface facing the image side, the third lens further includes a convex surface facing the image side, the fourth lens includes a convex surface facing the object side and a concave surface facing the image side, the fifth lens further includes a convex surface facing the object side, and the sixth lens includes a convex surface facing the object side and a concave surface facing the image side.

In yet another exemplary embodiment, the second lens includes a convex surface facing the object side and a concave surface facing the image side, the third lens further includes a convex surface facing the image side, the fourth lens includes a concave surface facing the object side and a convex surface facing the image side, the fifth lens further includes a convex surface facing the object side, and the sixth lens includes a concave surface facing the object side and a convex surface facing the image side.

In another exemplary embodiment, the second lens includes a convex surface facing the object side, the fourth lens includes a concave surface facing the image side, the fifth lens further includes a convex surface facing the object side, and the sixth lens includes a concave surface facing the image side.

In yet another exemplary embodiment, the second lens includes a convex surface facing the object side, the fourth lens includes a concave surface facing the image side, the fifth lens further includes a concave surface facing the object side, and the sixth lens includes a concave surface facing the image side.

In another exemplary embodiment, the wide-angle lens assembly satisfies: $0 \text{ mm} < f_1 + f_2 < 7$ mm, wherein $f_1$ is an effective focal length of the first lens and $f_2$ is an effective focal length of the second lens.

In yet another exemplary embodiment, the wide-angle lens assembly satisfies: $-6 \text{ mm} < f_3 + f_4 < 1$ mm, wherein $f_3$ is an effective focal length of the third lens and $f_4$ is an effective focal length of the fourth lens.

In another exemplary embodiment, the wide-angle lens assembly further includes a stop disposed between the second lens and the third lens.

In yet another exemplary embodiment, the wide-angle lens assembly satisfies: $0.5 < SL/TTL < 1.0$, wherein SL is an interval from the stop to an image plane along the optical axis and TTL is an interval from the convex surface of the first lens to the image plane along the optical axis.

In another exemplary embodiment, the wide-angle lens assembly satisfies: $-1 < (R_{31}+R_{32})/(R_{41}+R_{42}) < 5$, wherein $R_{31}$ is a radius of curvature of an object side surface of the third lens, $R_{32}$ is a radius of curvature of an image side surface of the third lens, $R_{41}$ is a radius of curvature of an object side surface of the fourth lens, and $R_{42}$ is a radius of curvature of an image side surface of the fourth lens.

In yet another exemplary embodiment, the wide-angle lens assembly satisfies: $0.15 < BFL/TTL < 0.25$, wherein BFL is an interval from an image side surface of the sixth lens to an image plane along the optical axis and TTL is an interval from the convex surface of the first lens to the image plane along the optical axis.

In another exemplary embodiment, the wide-angle lens assembly satisfies: $0.6 < f/f_2 < 0.85$, wherein f is an effective focal length of the wide-angle lens assembly and $f_2$ is an effective focal length of the second lens.

In yet another exemplary embodiment, the concave surface of the sixth lens further includes an inflection point.

In another exemplary embodiment, the convex surface of the sixth lens doesn't include an inflection point.

The wide-angle lens assembly in accordance with an exemplary embodiment of the invention includes a first lens, a second lens, a third lens, a fourth lens, a fifth lens, and a sixth lens, wherein the first lens, the second lens, the third lens, the fourth lens, the fifth lens, and the sixth lens are arranged in order from an object side to an image side along an optical axis. The first lens is with negative refractive power and includes a convex surface facing the object side and a concave surface facing the image side. The second lens is with positive refractive power. The third lens is with positive refractive power and includes a convex surface facing the object side. The fourth lens is with negative refractive power. The fifth lens is with positive refractive power and includes a convex surface facing the image side. The sixth lens is with negative refractive power. The wide-angle lens assembly satisfies: $0.4 < f/f_2 < 0.85$, wherein f is an effective focal length of the wide-angle lens assembly and $f_2$ is an effective focal length of the second lens.

In another exemplary embodiment, the second lens includes a concave surface facing the object side and a convex surface facing the image side, the third lens further includes a convex surface facing the image side, the fourth lens includes a convex surface facing the object side and a concave surface facing the image side, the fifth lens further includes a convex surface facing the object side, and the sixth lens includes a convex surface facing the object side and a concave surface facing the image side.

In yet another exemplary embodiment, the wide-angle lens assembly satisfies: $-1<(R_{31}+R_{32})/(R_{41}+R_{42})<5$, wherein $R_{31}$ is a radius of curvature of an object side surface of the third lens, $R_{32}$ is a radius of curvature of an image side surface of the third lens, $R_{41}$ is a radius of curvature of an object side surface of the fourth lens, and $R_{42}$ is a radius of curvature of an image side surface of the fourth lens.

In another exemplary embodiment, the wide-angle lens assembly satisfies: $0.15<BFL/TTL<0.25$, wherein BFL is an interval from an image side surface of the sixth lens to an image plane along the optical axis and TTL is an interval from the convex surface of the first lens to the image plane along the optical axis.

In yet another exemplary embodiment, the wide-angle assembly further includes a stop disposed between the second lens and the third lens, wherein the wide-angle lens assembly satisfies: $0$ mm$<f_1+f_2<7$ mm, $-6$ mm$<f_3+f_4<1$ mm, $-1.5<f_5/f_1<-0.5$, $0.5<SL/TTL<1.0$, wherein $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, SL is an interval from the stop to an image plane along the optical axis, and TTL is an interval from the convex surface of the first lens to the image plane along the optical axis.

In another exemplary embodiment, at least one of the convex surface and the concave surface of the sixth lens includes an inflection point.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 5 is a lens layout and optical path diagram of a wide-angle lens assembly in accordance with a third embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
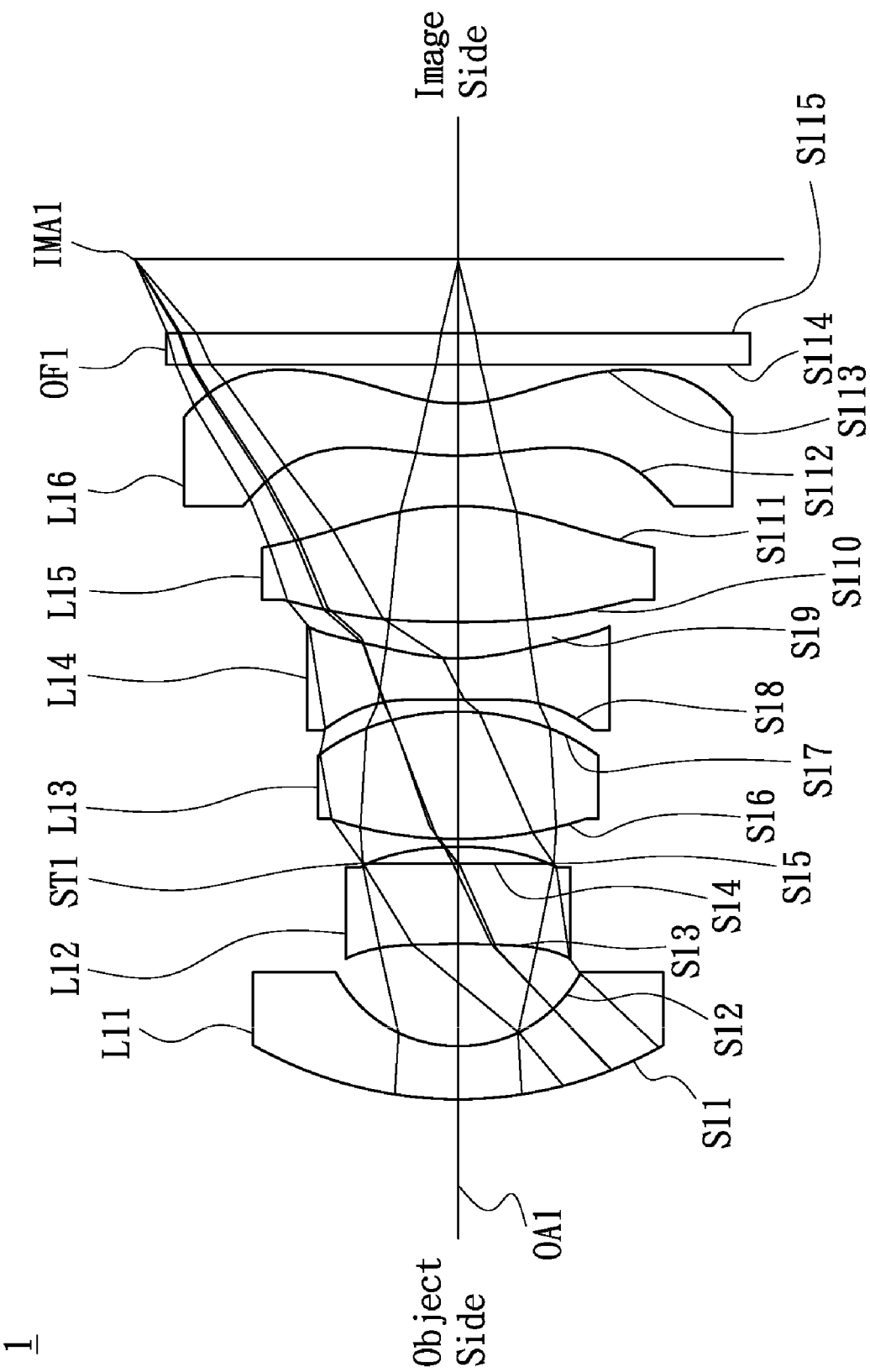
FIG. 1 is a lens layout and optical path diagram of a wide-angle lens assembly in accordance with a first embodiment of the invention.

Referring to FIG. 1, FIG. 1 is a lens layout and optical path diagram of a wide-angle lens assembly in accordance with a first embodiment of the invention. The wide-angle lens assembly 1 includes a first lens L11, a second lens L12, a stop ST1, a third lens L13, a fourth lens L14, a fifth lens L15, a sixth lens L16, and an optical filter OF1, all of which are arranged in order from an object side to an image side along an optical axis OA1. In operation, an image of light rays from the object side is formed at an image plane IMA1.

The first lens L11 is a meniscus lens with negative refractive power, wherein the object side surface S11 is a convex surface, the image side surface S12 is a concave surface, and both of the object side surface S11 and image side surface S12 are aspheric surfaces.

The second lens L12 is a meniscus lens with positive refractive power, wherein the object side surface S13 is a concave surface, the image side surface S14 is a convex surface, and both of the object side surface S13 and image side surface S14 are aspheric surfaces.

The third lens L13 is a biconvex lens with positive refractive power, wherein the object side surface S16 is a convex surface, the image side surface S17 is a convex surface, and both of the object side surface S16 and image side surface S17 are aspheric surfaces.

The fourth lens L14 is a meniscus lens with negative refractive power, wherein the object side surface S18 is a convex surface, the image side surface S19 is a concave surface, and both of the object side surface S18 and image side surface S19 are aspheric surfaces.

The fifth lens L15 is a biconvex lens with positive refractive power, wherein the object side surface S110 is a convex surface, the image side surface S111 is a convex surface, and both of the object side surface S110 and image side surface S111 are aspheric surfaces.

The sixth lens L16 is a meniscus lens with negative refractive power, wherein the object side surface S112 is a convex surface and includes two inflection points, the image side surface S113 is a concave surface and includes two inflection points, and both of the object side surface S112 and image side surface S113 are aspheric surfaces.

Both of the object side surface S114 and image side surface S115 of the optical filter OF1 are plane surfaces.

In order to maintain excellent optical performance of the wide-angle lens assembly in accordance with the first embodiment of the invention, the wide-angle lens assembly 1 satisfies at least one of the following conditions:

$$0.15 < BFL1/TTL1 < 0.25 \quad (1)$$

$$-1.5 < f1_5/f1_1 < -0.5 \quad (2)$$

$$0.6 < f1/f1_2 < 0.85 \quad (3)$$

$$0 \text{ mm} < f1_1 + f1_2 < 7 \text{ mm} \quad (4)$$

$$-6 \text{ mm} < f1_3 + f1_4 < 1 \text{ mm} \quad (5)$$

$$-1 < (R1_{31} + R1_{32})/(R1_{41} + R1_{42}) < 5 \quad (6)$$

$$0.5 < SL1/TTL1 < 1.0 \quad (7)$$

wherein BFL1 is an interval from the image side surface S113 of the sixth lens L16 to the image plane IMA1 along the optical axis OA1, TTL1 is an interval from the object side surface S11 of the first lens L11 to the image plane IMA1 along the optical axis OA1, f1 is an effective focal length of the wide-angle lens assembly 1, $f1_1$ is an effective focal length of the first lens L11, $f1_2$ is an effective focal length of the second lens L12, $f1_3$ is an effective focal length of the third lens L13, $f1_4$ is an effective focal length of the fourth lens L14, $f1_5$ is an effective focal length of the fifth lens L15, $R1_{31}$ is a radius of curvature of the object side surface S16 of the third lens L13, $R1_{32}$ is a radius of curvature of the image side surface S17 of the third lens L13, $R1_{41}$ is a radius of curvature of the object side surface S18 of the fourth lens L14, $R1_{42}$ is a radius of curvature of the image side surface S19 of the fourth lens L14, and SL1 is an interval from the stop ST1 to the image plane IMA1 along the optical axis OA1.

By the above design of the lenses, stop ST1, and satisfies at least one of the conditions (1)-(7), the wide-angle lens assembly 1 is provided with an effective shortened total lens length, an effective increased field of view, an increased resolution, and an effective corrected aberration.

In order to achieve the above purposes and effectively enhance the optical performance, the wide-angle lens assembly 1 in accordance with the first embodiment of the invention is provided with the optical specifications shown in Table 1, which include the effective focal length, F-number, total lens length, half field of view, radius of curvature of each lens surface, thickness between adjacent surface, refractive index of each lens, and Abbe number of each lens. Table 1 shows that the effective focal length is equal to 4.290 mm, F-number is equal to 2.04, total lens length is equal to 7.983 mm, and half field of view is equal to 60.5 degrees for the wide-angle lens assembly 1 of the first embodiment of the invention.

TABLE 1

Effective Focal Length = 4.290 mm F-number = 2.04
Total Lens Length = 7.983 mm Half Field of View = 60.5 Degrees

| Surface Number | Radius of Curvature (mm) | Thickness (mm) | Nd | Vd | Remark |
|---|---|---|---|---|---|
| S11 | 3.951 | 0.500 | 1.666 | 55.066 | The First Lens L11 |
| S12 | 1.371 | 0.974 | | | |
| S13 | −17.893 | 0.925 | 1.535 | 55.711 | The Second Lens L12 |
| S14 | −2.804 | −0.159 | | | |
| S15 | ∞ | 0.232 | | | Stop ST1 |
| S16 | 4.365 | 1.211 | 1.690 | 52.756 | The Third Lens L13 |
| S17 | −2.602 | 0.115 | | | |
| S18 | 11.613 | 0.392 | 1.651 | 21.516 | The Fourth Lens L14 |
| S19 | 1.843 | 0.345 | | | |
| S110 | 10.316 | 1.103 | 1.535 | 55.711 | The Fifth Lens L15 |
| S111 | −2.701 | 0.478 | | | |
| S112 | 2.562 | 0.496 | 1.535 | 55.711 | The Sixth Lens L16 |
| S113 | 1.453 | 0.370 | | | |
| S114 | ∞ | 0.300 | 1.517 | 64.167 | Optical Filter OF1 |
| S115 | ∞ | 0.701 | | | |

The aspheric surface sag z of each lens in table 1 can be calculated by the following formula:

$$z = ch^2/\{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the first embodiment, the conic constant k and the aspheric coefficients A, B, C, D, E, F, G of each surface are shown in Table 2.

TABLE 2

| Surface Number | k | A | B | C | D | E | F | G |
|---|---|---|---|---|---|---|---|---|
| S11 | −0.191620 | 0 | 0 | 0 | 0 | 0 | 0 | 0 |
| S12 | 0.137148 | 0 | 0 | 0 | 0 | 0 | 0 | 0 |
| S13 | 0 | −0.063940 | −0.009995 | −0.008886 | 0.003007 | 0 | 0 | 0 |

TABLE 2-continued

| Surface Number | k | A | B | C | D | E | F | G |
|---|---|---|---|---|---|---|---|---|
| S14 | −6.647128 | −0.088921 | 0.021898 | −0.010689 | 0.004327 | 0 | 0 | 0 |
| S16 | −10.034296 | 0.024959 | 0.000414 | −0.002304 | 0 | 0 | 0 | 0 |
| S17 | −0.939846 | −0.015205 | −0.009376 | 0.002705 | 0 | 0 | 0 | 0 |
| S18 | −295.844295 | −0.185766 | 0.044715 | −0.010164 | 0.003896 | 0 | 0 | 0 |
| S19 | −6.728389 | −0.066451 | 0.037383 | −0.009477 | 0.001838 | 0 | 0 | 0 |
| S110 | −299.624634 | 0.048444 | −0.018040 | 0.003897 | −0.000468 | 0 | 0 | 0 |
| S111 | 0 | 0.007574 | 0.016197 | −0.003868 | 0.000282 | 0 | 0 | 0 |
| S112 | 0 | −0.158911 | 0.041924 | −0.007942 | 0.000252 | 0.000062 | 0 | 0 |
| S113 | −3.512838 | −0.074866 | 0.022529 | −0.004577 | 0.000466 | −0.000019 | 0 | 0 |

Table 3 shows the parameters and condition values for conditions (1)-(7). As can be seen from Table 3, the wide-angle lens assembly 1 of the first embodiment satisfies the conditions (1)-(7).

TABLE 3

| | | | | | |
|---|---|---|---|---|---|
| BFL1 | 1.371 mm | TTL1 | 7.983 mm | f1 | 4.290 mm |
| f1$_1$ | −3.405 mm | f1$_2$ | 6.053 mm | f1$_3$ | 2.532 mm |
| f1$_4$ | −3.383 mm | f1$_5$ | 4.102 mm | R1$_{31}$ | 4.365 mm |
| R1$_{32}$ | −2.602 mm | R1$_{41}$ | 11.613 mm | R1$_{42}$ | 1.843 mm |
| SL1 | 5.743 mm | | | | |
| BFL1/TTL1 | 0.172 | f1$_5$/f1$_1$ | −1.205 | f1/f1$_2$ | 0.709 |
| f1$_1$ + f1$_2$ | 2.668 mm | f1$_3$ + f1$_4$ | −0.876 mm | (R1$_{31}$ + R1$_{32}$)/(R1$_{41}$ + R1$_{42}$) | 0.131 |
| SL1/TTL1 | 0.719 | | | | |

Figure 2A:
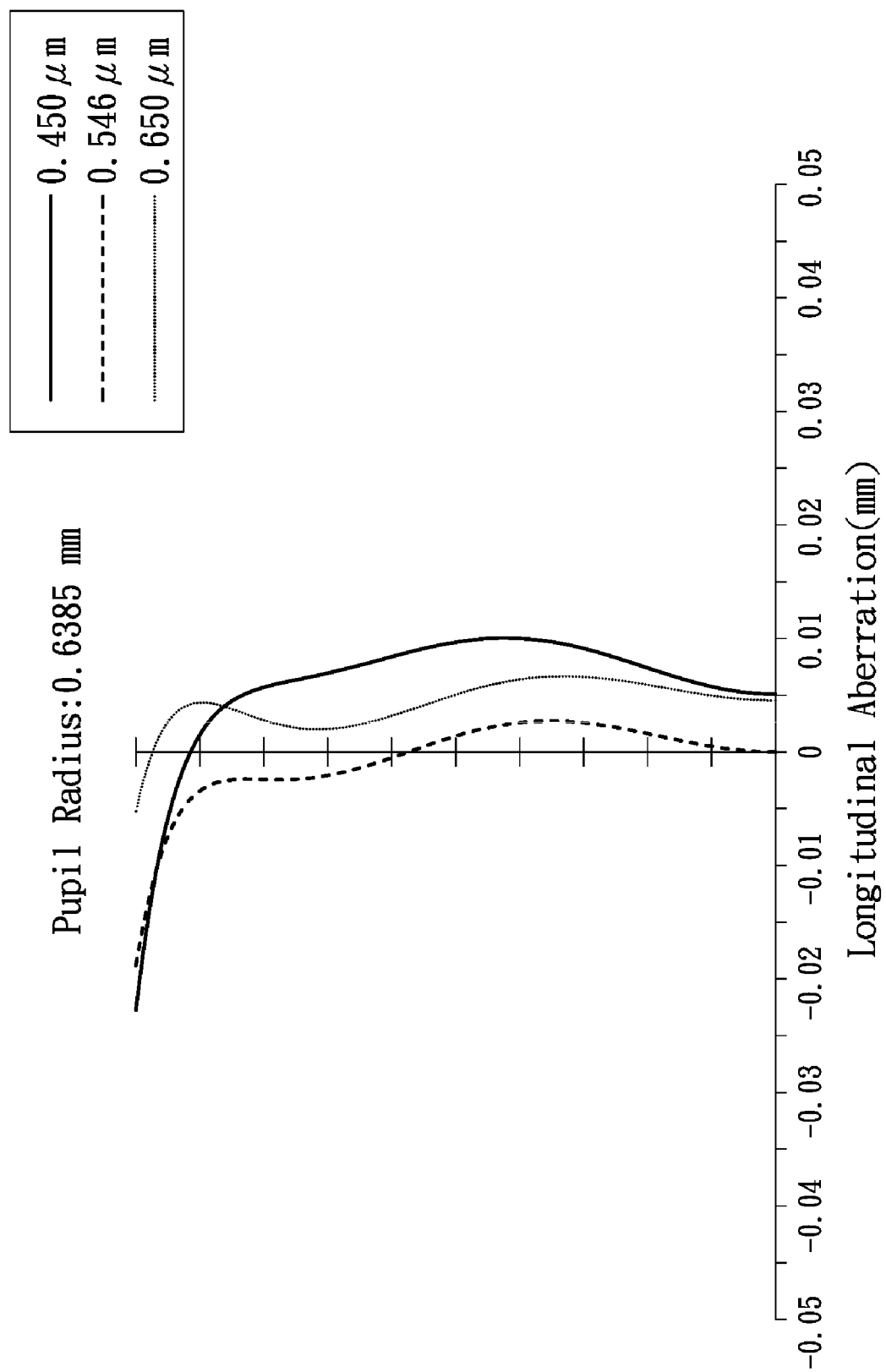
FIG. 2A depicts a longitudinal aberration diagram of the wide-angle lens assembly in accordance with the first embodiment of the invention.
Figure 2B:
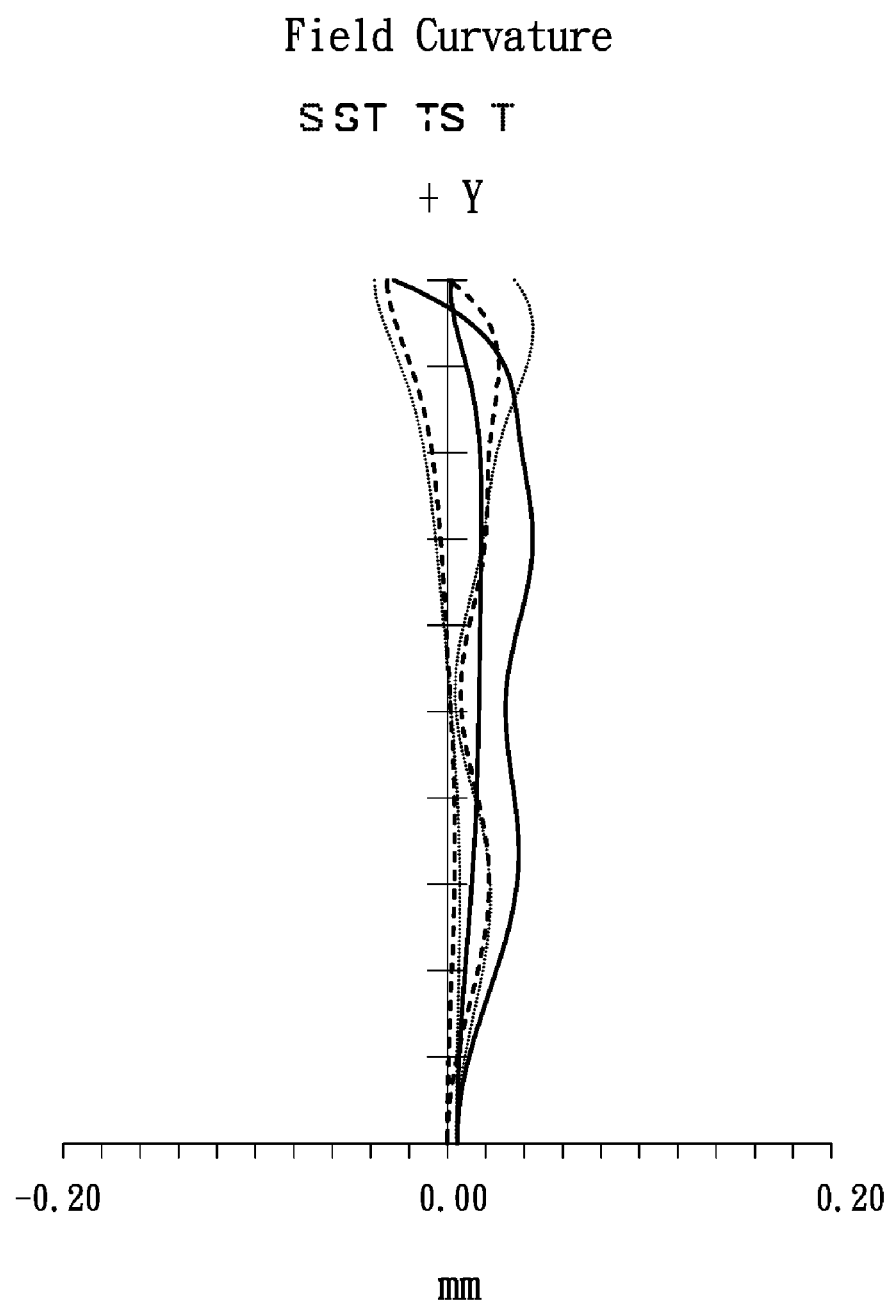
FIG. 2B is a field curvature diagram of the wide-angle lens assembly in accordance with the first embodiment of the invention.
Figure 2C:
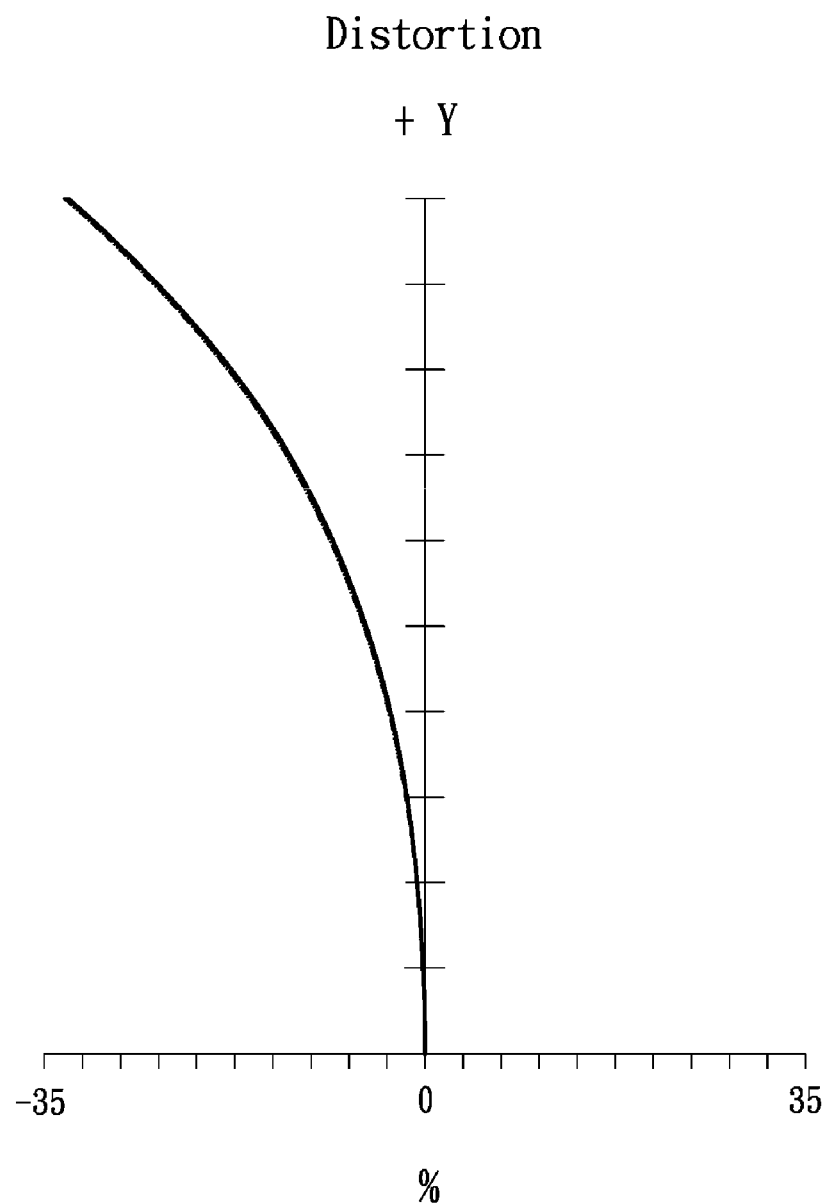
FIG. 2C is a distortion diagram of the wide-angle lens assembly in accordance with the first embodiment of the invention.

By the above arrangements of the lenses and stop ST1, the wide-angle lens assembly 1 of the first embodiment can meet the requirements of optical performance as seen in FIGS. 2A-2C, wherein FIG. 2A shows a longitudinal aberration diagram of the wide-angle lens assembly 1 in accordance with the first embodiment of the invention, FIG. 2B shows a field curvature diagram of the wide-angle lens assembly 1 in accordance with the first embodiment of the invention, and FIG. 2C shows a distortion diagram of the wide-angle lens assembly 1 in accordance with the first embodiment of the invention.

It can be seen from FIG. 2A that the longitudinal aberration in the wide-angle lens assembly 1 of the first embodiment ranges from −0.025 mm to 0.015 mm for the wavelength of 0.450 µm, 0.546 µm, and 0.650 µm.

It can be seen from FIG. 2B that the field curvature of tangential direction and sagittal direction in the wide-angle lens assembly 1 of the first embodiment ranges from −0.04 mm to 0.05 mm for the wavelength of 0.450 µm, 0.546 µm, and 0.650 µm.

It can be seen from FIG. 2C (in which the three lines in the figure almost coincide to appear as if a signal line) that the distortion in the wide-angle lens assembly 1 of the first embodiment ranges from −35% to 0% for the wavelength of 0.450 µm, 0.546 µm, and 0.650 µm.

It is obvious that the longitudinal aberration, the field curvature, and the distortion of the wide-angle lens assembly 1 of the first embodiment can be corrected effectively. Therefore, the wide-angle lens assembly 1 of the first embodiment is capable of good optical performance.

Figure 3:
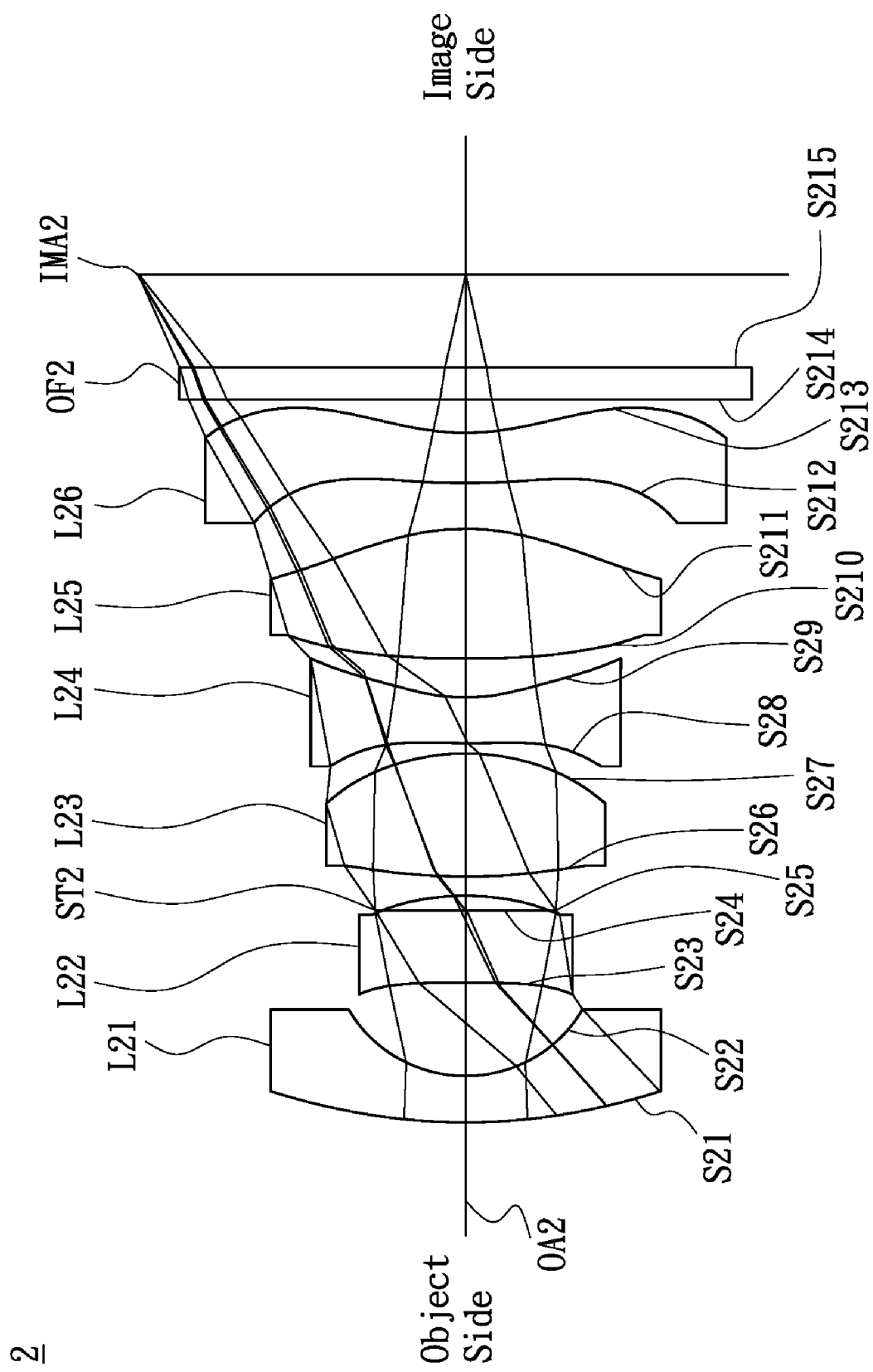
FIG. 3 is a lens layout and optical path diagram of a wide-angle lens assembly in accordance with a second embodiment of the invention.

Referring to FIG. 3, FIG. 3 is a lens layout and optical path diagram of a wide-angle lens assembly in accordance with a second embodiment of the invention. The wide-angle lens assembly 2 includes a first lens L21, a second lens L22, a stop ST2, a third lens L23, a fourth lens L24, a fifth lens L25, a sixth lens L26, and an optical filter OF2, all of which are arranged in order from an object side to an image side along an optical axis OA2. In operation, an image of light rays from the object side is formed at an image plane IMA2.

The first lens L21 is a meniscus lens with negative refractive power, wherein the object side surface S21 is a convex surface, the image side surface S22 is a concave surface, and both of the object side surface S21 and image side surface S22 are aspheric surfaces.

The second lens L22 is a meniscus lens with positive refractive power, wherein the object side surface S23 is a concave surface, the image side surface S24 is a convex surface, and both of the object side surface S23 and image side surface S24 are aspheric surfaces.

The third lens L23 is a biconvex lens with positive refractive power, wherein the object side surface S26 is a convex surface, the image side surface S27 is a convex surface, and both of the object side surface S26 and image side surface S27 are aspheric surfaces.

The fourth lens L24 is a meniscus lens with negative refractive power, wherein the object side surface S28 is a convex surface, the image side surface S29 is a concave surface, and both of the object side surface S28 and image side surface S29 are aspheric surfaces.

The fifth lens L25 is a biconvex lens with positive refractive power, wherein the object side surface S210 is a convex surface, the image side surface S211 is a convex surface, and both of the object side surface S210 and image side surface S211 are aspheric surfaces.

The sixth lens L26 is a meniscus lens with negative refractive power, wherein the object side surface S212 is a convex surface and includes two inflection points, the image side surface S213 is a concave surface and includes two inflection points, and both of the object side surface S212 and image side surface S213 are aspheric surfaces.

Both of the object side surface S214 and image side surface S215 of the optical filter OF2 are plane surfaces.

In order to maintain excellent optical performance of the wide-angle lens assembly in accordance with the second embodiment of the invention, the wide-angle lens assembly 2 satisfies at least one of the following conditions:

$$0.15 < BFL2/TTL2 < 0.25 \quad (8)$$

$$-1.5 < f2_5/f2_1 < -0.5 \quad (9)$$

$$0.6 < f2/f2_2 < 0.85 \quad (10)$$

$$0 \text{ mm} < f2_1 + f2_2 < 7 \text{ mm} \quad (11)$$

$$-6 \text{ mm} < f2_3 + f2_4 < 1 \text{ mm} \quad (12)$$

$$-1 < (R2_{31} + R2_{32})/(R2_{41} + R2_{42}) < 5 \quad (13)$$

$$0.5 < SL2/TTL2 < 1.0 \quad (14)$$

The definition of BFL2, TTL2, f2, $f2_1$, $f2_2$, $f2_3$, $f2_4$, $f2_5$, $R2_{31}$, $R2_{32}$, $R2_{41}$, $R2_{42}$ and SL2 are the same as that of BFL1, TTL1, f1, $f1_1$, $f1_2$, $f1_3$, $f1_4$, $f1_5$, $R1_{31}$, $R1_{32}$, $R1_{41}$, $R1_{42}$ and SL1 in the first embodiment, and is not described here again.

By the above design of the lenses, stop ST2, and satisfies at least one of the conditions (8)-(14), the wide-angle lens assembly 2 is provided with an effective shortened total lens length, an effective increased field of view, an increased resolution, and an effective corrected aberration.

In order to achieve the above purposes and effectively enhance the optical performance, the wide-angle lens assembly 2 in accordance with the second embodiment of the invention is provided with the optical specifications shown in Table 4, which include the effective focal length, F-number, total lens length, half field of view, radius of curvature of each lens surface, thickness between adjacent surface, refractive index of each lens, and Abbe number of each lens. Table 4 shows that the effective focal length is equal to 4.488 mm, F-number is equal to 2.25, total lens length is equal to 7.988 mm, and half field of view is equal to 60.3 degrees for the wide-angle lens assembly 2 of the second embodiment of the invention.

TABLE 4

Effective Focal Length = 4.488 mm F-number = 2.25
Total Lens Length = 7.988 mm Half Field of View = 60.3 Degrees

| Surface Number | Radius of Curvature (mm) | Thickness (mm) | Nd | Vd | Remark |
|---|---|---|---|---|---|
| S21 | 5.502 | 0.439 | 1.535 | 55.711 | The First Lens L21 |
| S22 | 1.304 | 0.878 | | | |
| S23 | −23.711 | 0.817 | 1.535 | 55.711 | The Second Lens L22 |
| S24 | −2.662 | −0.135 | | | |
| S25 | ∞ | 0.319 | | | Stop ST2 |
| S26 | 6.412 | 1.159 | 1.690 | 52.756 | The Third Lens L23 |
| S27 | −2.153 | 0.097 | | | |
| S28 | 8.400 | 0.430 | 1.651 | 21.516 | The Fourth Lens L24 |
| S29 | 1.595 | 0.368 | | | |
| S210 | 9.755 | 1.221 | 1.535 | 55.711 | The Fifth Lens L25 |
| S211 | −2.286 | 0.431 | | | |
| S212 | 5.688 | 0.475 | 1.535 | 55.711 | The Sixth Lens L26 |
| S213 | 2.290 | 0.313 | | | |
| S214 | ∞ | 0.300 | 1.517 | 64.167 | Optical Filter OF2 |
| S215 | ∞ | 0.876 | | | |

The aspheric surface sag z of each lens in table 4 can be calculated by the following formula:

$$z = ch^2/\{1 + [1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the second embodiment, the conic constant k and the aspheric coefficients A, B, C, D, E, F, G of each surface are shown in Table 5.

TABLE 5

| Surface Number | k | A | B | C | D | E | F | G |
|---|---|---|---|---|---|---|---|---|
| S21 | −2.656617 | 0 | 0 | 0 | 0 | 0 | 0 | 0 |
| S22 | 0.076757 | 0 | 0 | 0 | 0 | 0 | 0 | 0 |
| S23 | 0 | −0.058965 | −0.031302 | 0.008271 | −0.004886 | 0 | 0 | 0 |
| S24 | −4.346531 | −0.081439 | 0.029360 | −0.043299 | 0.023248 | 0 | 0 | 0 |
| S26 | −38.892448 | 0.032623 | −0.016078 | −0.000043 | 0 | 0 | 0 | 0 |
| S27 | −1.617099 | −0.011096 | −0.013361 | 0.001072 | 0 | 0 | 0 | 0 |
| S28 | −270.051098 | −0.138006 | 0.016418 | 0.004128 | −0.000394 | 0 | 0 | 0 |
| S29 | −6.888952 | −0.029304 | 0.005974 | 0.005988 | −0.001542 | 0 | 0 | 0 |
| S210 | −871.024000 | 0.049049 | −0.020222 | 0.005379 | −0.000576 | 0 | 0 | 0 |
| S211 | 0 | 0.032345 | 0.003951 | −0.001003 | 0.000141 | 0 | 0 | 0 |
| S212 | 0 | −0.045023 | −0.004096 | 0.001992 | −0.000194 | −0.000018 | 0 | 0 |
| S213 | −2.968698 | −0.044221 | 0.003632 | 0.000103 | −0.000051 | 0.000002 | 0 | 0 |

Table 6 shows the parameters and condition values for conditions (8)-(14). As can be seen from Table 6, the wide-angle lens assembly 2 of the second embodiment satisfies the conditions (8)-(14).

TABLE 6

| BFL2 | 1.489 mm | TTL2 | 7.988 mm | f2 | 4.488 mm |
|---|---|---|---|---|---|
| $f2_1$ | −3.298 mm | $f2_2$ | 5.501 mm | $f2_3$ | 2.461 mm |
| $f2_4$ | −3.068 mm | $f2_5$ | 3.570 mm | $R2_{31}$ | 6.412 mm |
| $R2_{32}$ | −2.153 mm | $R2_{41}$ | 8.400 mm | $R2_{42}$ | 1.595 mm |
| SL2 | 5.989 mm | | | | |
| BFL2/TTL2 | 0.186 | $f2_5/f2_1$ | −1.082 | $f2/f2_2$ | 0.816 |
| $f2_1 + f2_2$ | 2.215 mm | $f2_3 + f2_4$ | −0.095 mm | $(R2_{31} + R2_{32})/(R2_{41} + R2_{42})$ | 0.426 |
| SL2/TTL2 | 0.750 | | | | |

Figure 4A:
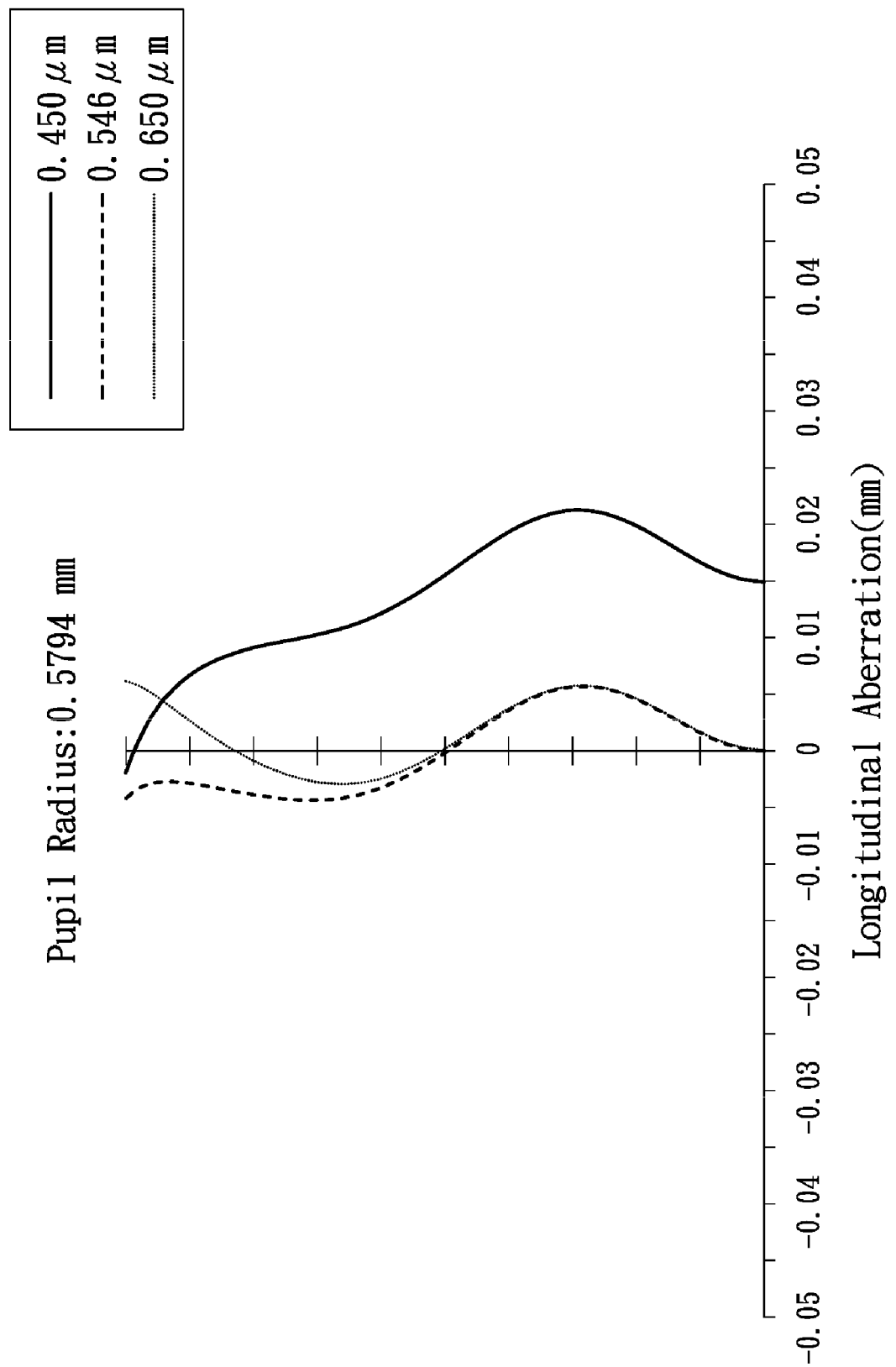
FIG. 4A depicts a longitudinal aberration diagram of the wide-angle lens assembly in accordance with the second embodiment of the invention.
Figure 4B:
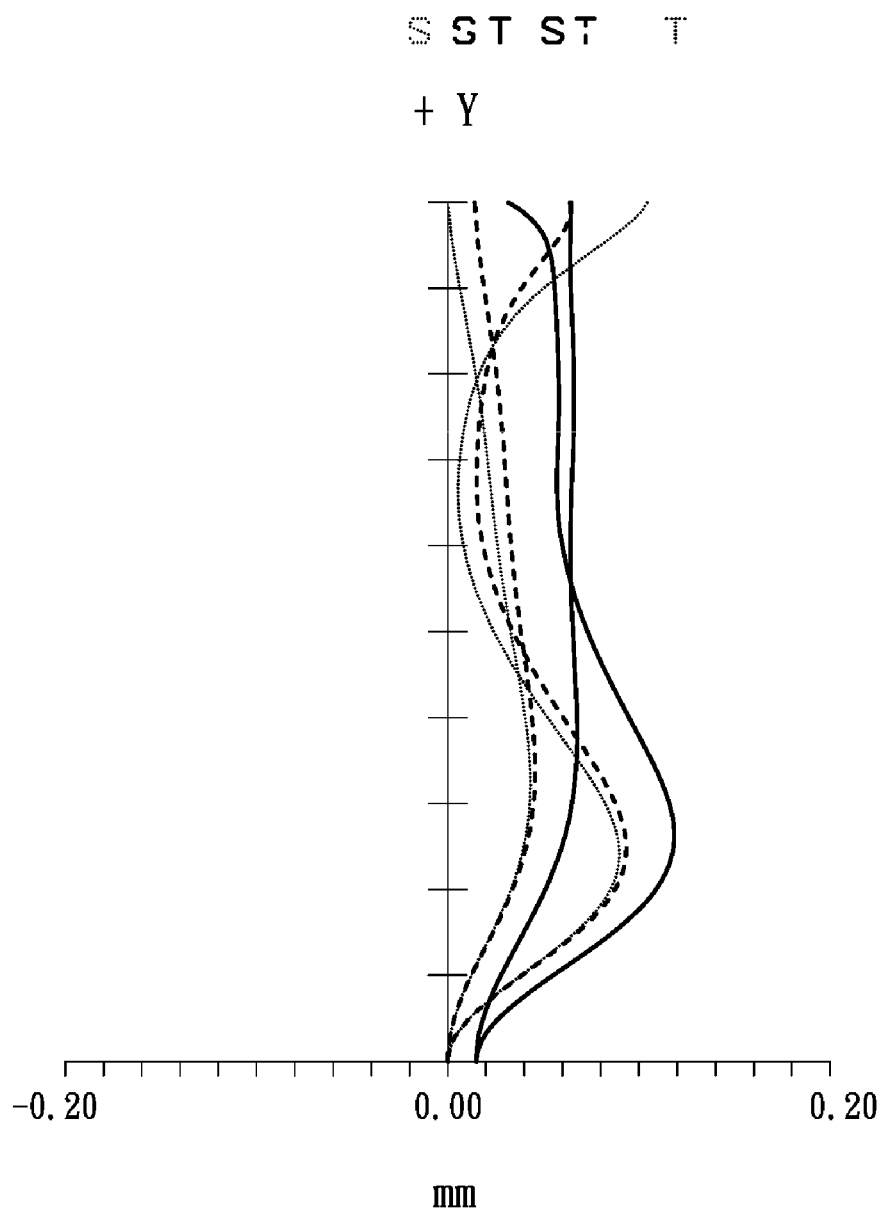
FIG. 4B is a field curvature diagram of the wide-angle lens assembly in accordance with the second embodiment of the invention.
Figure 4C:
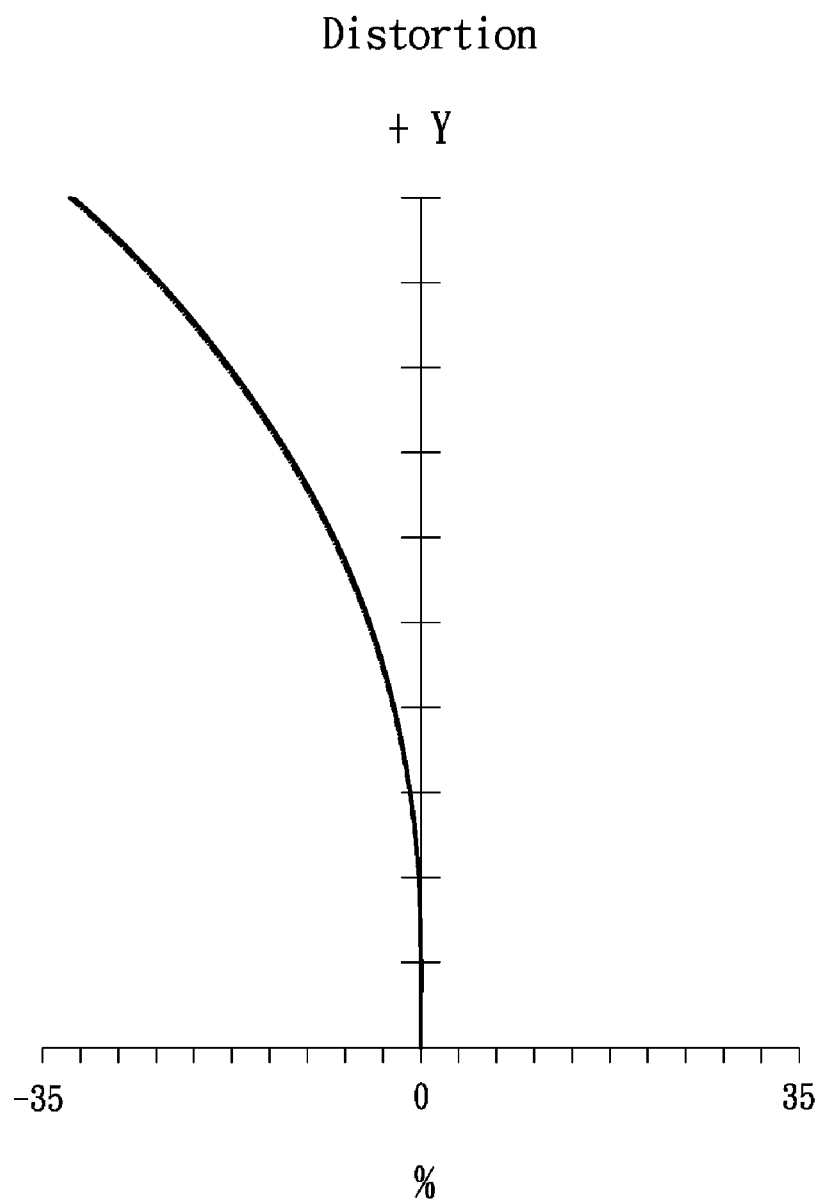
FIG. 4C is a distortion diagram of the wide-angle lens assembly in accordance with the second embodiment of the invention.

By the above arrangements of the lenses and stop ST2, the wide-angle lens assembly 2 of the second embodiment can meet the requirements of optical performance as seen in FIGS. 4A-4C, wherein FIG. 4A shows a longitudinal aberration diagram of the wide-angle lens assembly 2 in accordance with the second embodiment of the invention, FIG. 4B shows a field curvature diagram of the wide-angle lens assembly 2 in accordance with the second embodiment of the invention, and FIG. 4C shows a distortion diagram of the wide-angle lens assembly 2 in accordance with the second embodiment of the invention.

It can be seen from FIG. 4A that the longitudinal aberration in the wide-angle lens assembly 2 of the second embodiment ranges from −0.005 mm to 0.025 mm for the wavelength of 0.450 μm, 0.546 μm, and 0.650 μm.

It can be seen from FIG. 4B that the field curvature of tangential direction and sagittal direction in the wide-angle lens assembly 2 of the second embodiment ranges from 0.00 mm to 0.12 mm for the wavelength of 0.450 μm, 0.546 μm, and 0.650 μm.

It can be seen from FIG. 4C (in which the three lines in the figure almost coincide to appear as if a signal line) that the distortion in the wide-angle lens assembly 2 of the second embodiment ranges from −35% to 0% for the wavelength of 0.450 μm, 0.546 μm, and 0.650 μm.

It is obvious that the longitudinal aberration, the field curvature, and the distortion of the wide-angle lens assembly 2 of the second embodiment can be corrected effectively. Therefore, the wide-angle lens assembly 2 of the second embodiment is capable of good optical performance.

Referring to FIG. 5, FIG. 5 is a lens layout and optical path diagram of a wide-angle lens assembly in accordance with a third embodiment of the invention. The wide-angle lens assembly 3 includes a first lens L31, a second lens L32, a stop ST3, a third lens L33, a fourth lens L34, a fifth lens L35, a sixth lens L36, and an optical filter OF3, all of which are arranged in order from an object side to an image side along an optical axis OA3. In operation, an image of light rays from the object side is formed at an image plane IMA3.

The first lens L31 is a meniscus lens with negative refractive power, wherein the object side surface S31 is a convex surface, the image side surface S32 is a concave surface, and both of the object side surface S31 and image side surface S32 are aspheric surfaces.

The second lens L32 is a meniscus lens with positive refractive power, wherein the object side surface S33 is a concave surface, the image side surface S34 is a convex surface, and both of the object side surface S33 and image side surface S34 are aspheric surfaces.

The third lens L33 is a biconvex lens with positive refractive power, wherein the object side surface S36 is a convex surface, the image side surface S37 is a convex surface, and both of the object side surface S36 and image side surface S37 are aspheric surfaces.

The fourth lens L34 is a meniscus lens with negative refractive power, wherein the object side surface S38 is a convex surface, the image side surface S39 is a concave surface, and both of the object side surface S38 and image side surface S39 are aspheric surfaces.

The fifth lens L35 is a biconvex lens with positive refractive power, wherein the object side surface S310 is a convex surface, the image side surface S311 is a convex surface, and both of the object side surface S310 and image side surface S311 are aspheric surfaces.

The sixth lens L36 is a meniscus lens with negative refractive power, wherein the object side surface S312 is a convex surface and includes two inflection points, the image side surface S313 is a concave surface and includes two inflection points, and both of the object side surface S312 and image side surface S313 are aspheric surfaces.

Both of the object side surface S314 and image side surface S315 of the optical filter OF3 are plane surfaces.

In order to maintain excellent optical performance of the wide-angle lens assembly in accordance with the third embodiment of the invention, the wide-angle lens assembly 3 satisfies at least one of the following conditions:

$$0.15 < BFL3/TTL3 < 0.25 \tag{15}$$

$$-1.5 < f3_5/f3_1 < -0.5 \tag{16}$$

$$0.6 < f3/f3_2 < 0.85 \tag{17}$$

$$0 \text{ mm} < f3_1 + f3_2 < 7 \text{ mm} \tag{18}$$

$$-6 \text{ mm} < f3_3 + f3_4 < 1 \text{ mm} \tag{19}$$

$$-1 < (R3_{31} + R3_{32})/(R3_{41} + R3_{42}) < 5 \tag{20}$$

$$0.5 < SL3/TTL3 < 1.0 \tag{21}$$

The definition of BFL3, TTL3, f3, $f3_1$, $f3_2$, $f3_3$, $f3_4$, $f3_5$, $R3_{31}$, $R3_{32}$, $R3_{41}$, $R3_{42}$ and SL3 are the same as that of BFL1, TTL1, f1, $f1_1$, $f1_2$, $f1_3$, $f1_4$, f15, $R1_{31}$, $R1_{32}$, $R1_{41}$, $R1_{42}$ and SL1 in the first embodiment, and is not described here again.

By the above design of the lenses, stop ST3, and satisfies at least one of the conditions (15)-(21), the wide-angle lens assembly 3 is provided with an effective shortened total lens length, an effective increased field of view, an increased resolution, and an effective corrected aberration.

In order to achieve the above purposes and effectively enhance the optical performance, the wide-angle lens assembly 3 in accordance with the third embodiment of the invention is provided with the optical specifications shown in Table 7, which include the effective focal length, F-number, total lens length, half field of view, radius of curvature of each lens surface, thickness between adjacent surface, refractive index of each lens, and Abbe number of each lens. Table 7 shows that the effective focal length is equal to 4.262 mm, F-number is equal to 2.23, total lens length is equal to 4.881 mm, and half field of view is equal to 58.9 degrees for the wide-angle lens assembly 3 of the third embodiment of the invention.

TABLE 7

Effective Focal Length = 4.262 mm F-number = 2.23
Total Lens Length = 4.881 mm Half Field of View = 58.9 Degrees

| Surface Number | Radius of Curvature (mm) | Thickness (mm) | Nd | Vd | Remark |
|---|---|---|---|---|---|
| S31 | 1.428 | 0.285 | 1.535 | 55.711 | The First Lens L31 |
| S32 | 0.668 | 0.595 | | | |
| S33 | −20.009 | 0.377 | 1.535 | 55.711 | The Second Lens L32 |
| S34 | −3.188 | −0.076 | | | |
| S35 | ∞ | 0.107 | | | Stop ST3 |
| S36 | 2.140 | 0.685 | 1.535 | 55.711 | The Third Lens L33 |
| S37 | −1.357 | 0.036 | | | |
| S38 | 2.335 | 0.249 | 1.651 | 21.516 | The Fourth Lens L34 |
| S39 | 1.019 | 0.294 | | | |
| S310 | 33.469 | 0.589 | 1.535 | 55.711 | The Fifth Lens L35 |
| S311 | −1.484 | 0.389 | | | |
| S312 | 2.325 | 0.381 | 1.582 | 30.182 | The Sixth Lens L36 |
| S313 | 1.081 | 0.290 | | | |
| S314 | ∞ | 0.210 | 1.517 | 64.167 | Optical Filter OF3 |
| S315 | ∞ | 0.470 | | | |

The aspheric surface sag z of each lens in table 7 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16}$$

where c is curvature, h is the vertical distance from the lens surface to the optical axis, k is conic constant and A, B, C, D, E, F and G are aspheric coefficients.

In the third embodiment, the conic constant k and the aspheric coefficients A, B, C, D, E, F, G of each surface are shown in Table 8.

TABLE 8

| Surface Number | k | A | B | C | D | E | F | G |
|---|---|---|---|---|---|---|---|---|
| S31 | −1.186017 | −0.049644 | −0.043065 | 0.007307 | 0.007951 | 0 | 0 | 0 |
| S32 | −0.831624 | 0.134537 | −0.005471 | 0.306249 | −0.887182 | 0 | 0 | 0 |

TABLE 8-continued

| Surface Number | k | A | B | C | D | E | F | G |
|---|---|---|---|---|---|---|---|---|
| S33 | 0 | −0.248707 | −0.225461 | −1.249498 | 1.685805 | 0 | 0 | 0 |
| S34 | 19.849809 | −0.585022 | 0.876516 | −1.547184 | 2.350279 | 0 | 0 | 0 |
| S36 | −24.977680 | −0.049201 | 0.104291 | −0.237801 | 0.179338 | 0 | 0 | 0 |
| S37 | 0.278671 | 0.089706 | −0.455542 | 0.318884 | −0.038313 | 0 | 0 | 0 |
| S38 | −32.970006 | −0.406408 | 0.200397 | −0.222566 | 0.203772 | 0 | 0 | 0 |
| S39 | −6.548472 | −0.167845 | 0.236556 | −0.122785 | 0.031914 | 0 | 0 | 0 |
| S310 | 0 | 0.121538 | −0.062102 | 0.026839 | −0.009507 | 0 | 0 | 0 |
| S311 | −1.557758 | 0.138527 | 0.035631 | −0.030284 | 0.003384 | 0 | 0 | 0 |
| S312 | 0.077105 | −0.326864 | 0.173803 | −0.065680 | 0.010077 | 0 | 0 | 0 |
| S313 | −4.414444 | −0.170338 | 0.094818 | −0.035594 | 0.006667 | −0.000525 | 0 | 0 |

Table 9 shows the parameters and condition values for conditions (15)-(21). As can be seen from Table 9, the wide-angle lens assembly 3 of the third embodiment satisfies the conditions (15)-(21).

TABLE 9

| BFL3 | 0.970 mm | TTL3 | 4.881 mm | f3 | 4.262 mm |
|---|---|---|---|---|---|
| f$3_1$ | −2.688 mm | f$3_2$ | 6.997 mm | f$3_3$ | 1.658 mm |
| f$3_4$ | −2.969 mm | f$3_5$ | 2.659 mm | R$3_{31}$ | 2.140 mm |
| R$3_{32}$ | −1.357 mm | R$3_{41}$ | 2.335 mm | R$3_{42}$ | 1.019 mm |
| SL3 | 3.7 mm | | | | |
| BFL3/TTL3 | 0.199 | f$3_5$/f$3_1$ | −0.989 | f3/f$3_2$ | 0.609 |
| f$3_1$ + f$3_2$ | 4.335 mm | f$3_3$ + f$3_4$ | −1.335 mm | (R$3_{31}$ + R$3_{32}$)/(R$3_{41}$ + R$3_{42}$) | 0.233 |
| SL3/TTL3 | 0.758 | | | | |

Figure 6A:
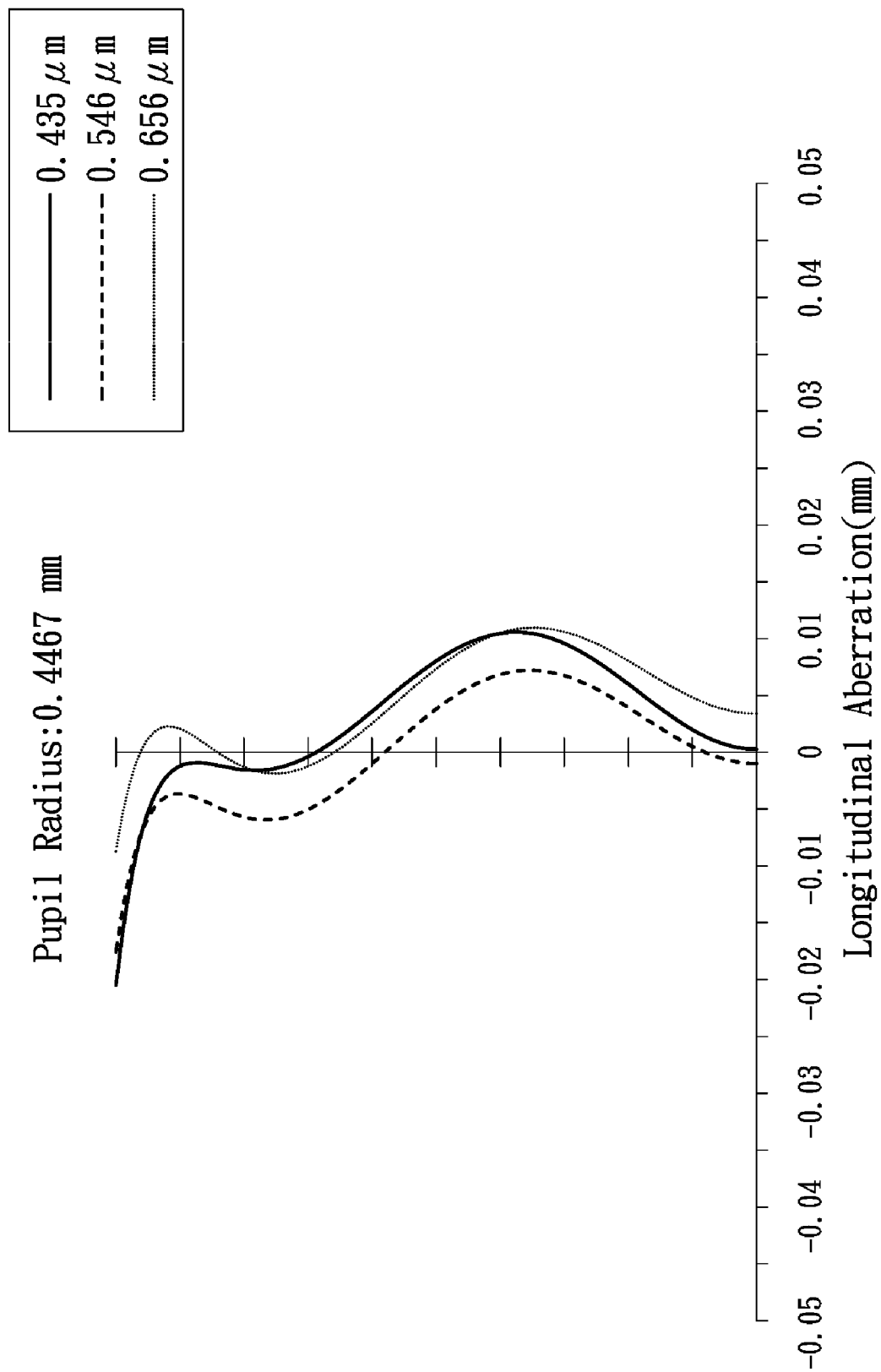
FIG. 6A depicts a longitudinal aberration diagram of the wide-angle lens assembly in accordance with the third embodiment of the invention.
Figure 6B:
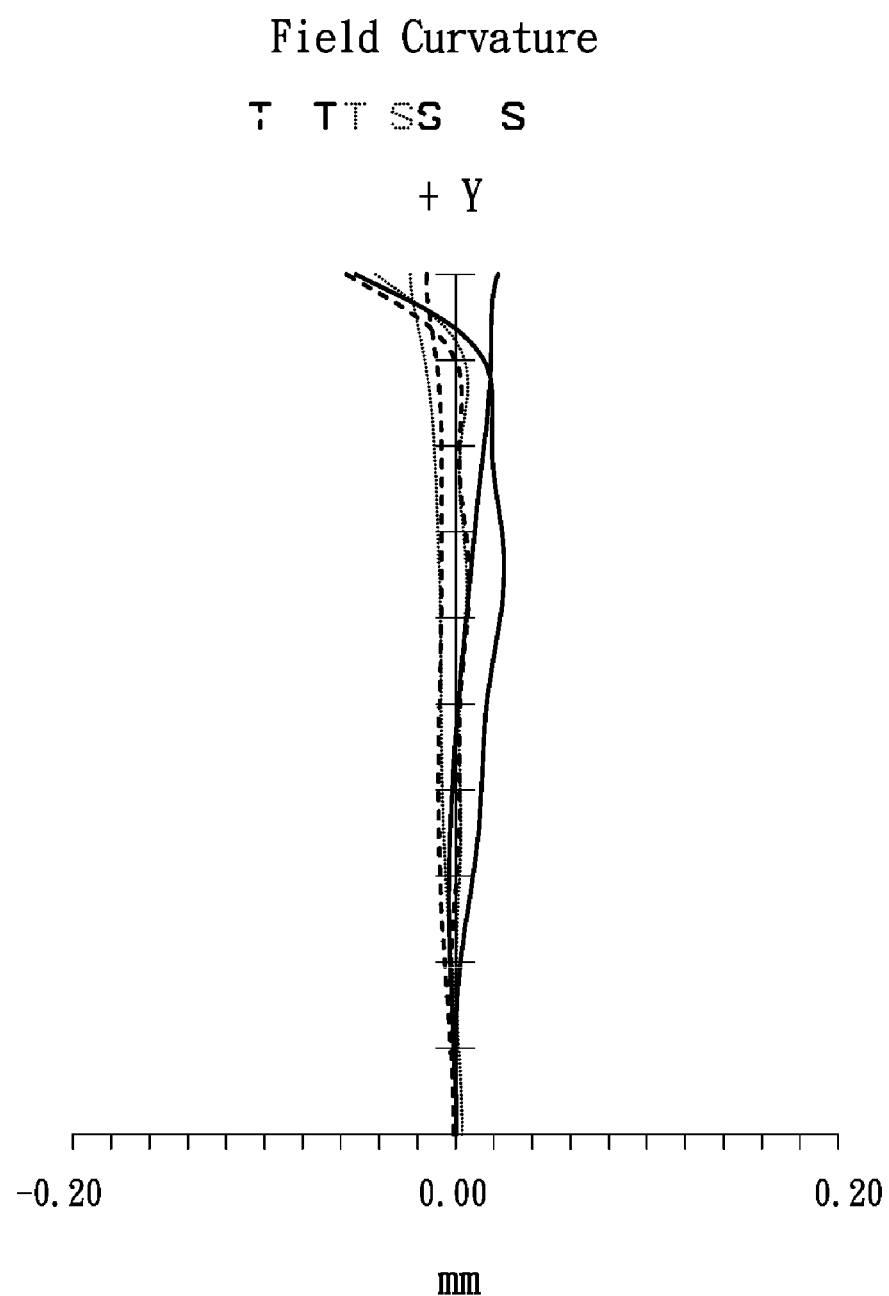
FIG. 6B is a field curvature diagram of the wide-angle lens assembly in accordance with the third embodiment of the invention.
Figure 6C:
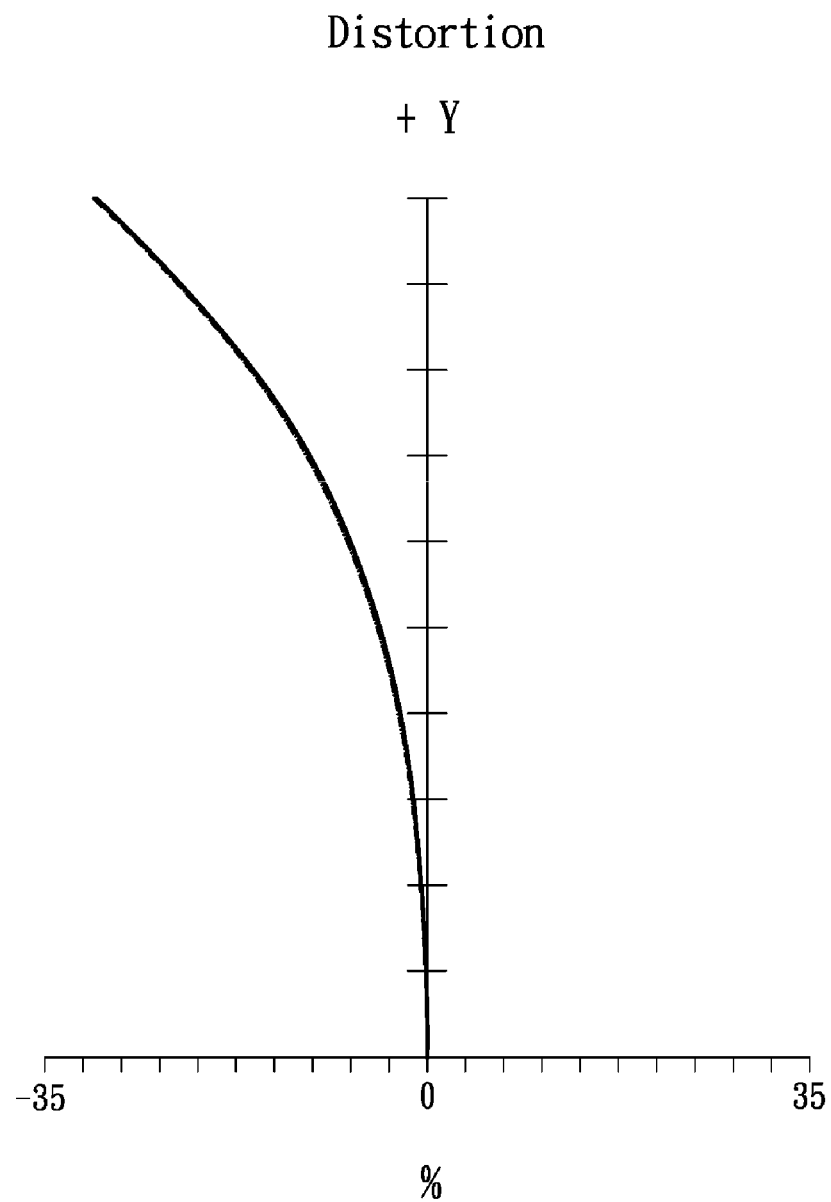
FIG. 6C is a distortion diagram of the wide-angle lens assembly in accordance with the third embodiment of the invention.

By the above arrangements of the lenses and stop ST3, the wide-angle lens assembly 3 of the third embodiment can meet the requirements of optical performance as seen in FIGS. 6A-6C, wherein FIG. 6A shows a longitudinal aberration diagram of the wide-angle lens assembly 3 in accordance with the third embodiment of the invention, FIG. 6B shows a field curvature diagram of the wide-angle lens assembly 3 in accordance with the third embodiment of the invention, and FIG. 6C shows a distortion diagram of the wide-angle lens assembly 3 in accordance with the third embodiment of the invention.

It can be seen from FIG. 6A that the longitudinal aberration in the wide-angle lens assembly 3 of the third embodiment ranges from −0.025 mm to 0.015 mm for the wavelength of 0.450 μm, 0.546 μm, and 0.650 μm.

It can be seen from FIG. 6B that the field curvature of tangential direction and sagittal direction in the wide-angle lens assembly 3 of the third embodiment ranges from −0.06 mm to 0.04 mm for the wavelength of 0.450 μm, 0.546 μm, and 0.650 μm.

It can be seen from FIG. 6C (in which the three lines in the figure almost coincide to appear as if a signal line) that the distortion in the wide-angle lens assembly 3 of the third embodiment ranges from −35% to 0% for the wavelength of 0.450 μm, 0.546 μm, and 0.650 μm.

It is obvious that the longitudinal aberration, the field curvature, and the distortion of the wide-angle lens assembly 3 of the third embodiment can be corrected effectively. Therefore, the wide-angle lens assembly 3 of the third embodiment is capable of good optical performance.

Figure 7:
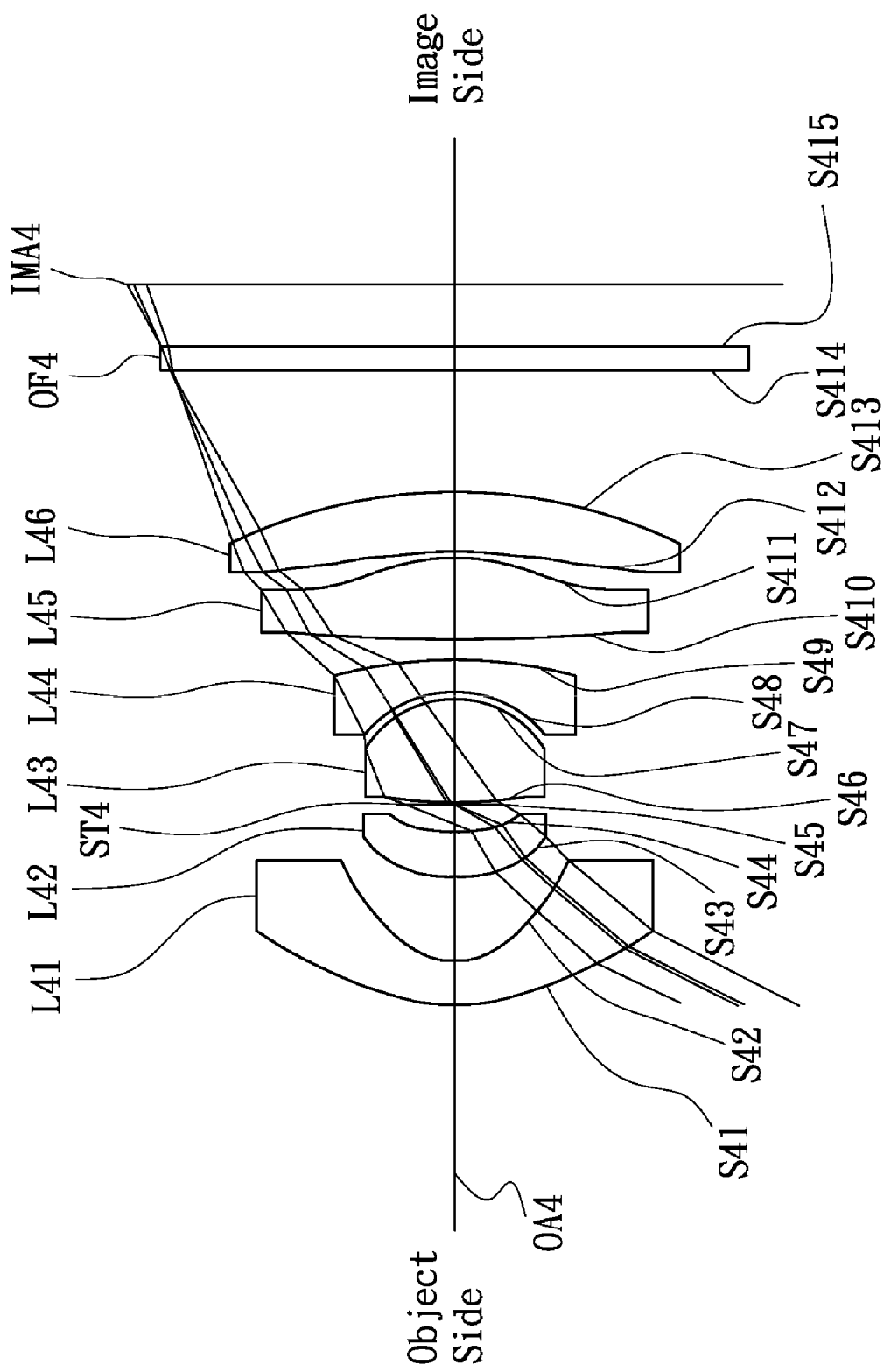
FIG. 7 is a lens layout and optical path diagram of a wide-angle lens assembly in accordance with a fourth embodiment of the invention.

Referring to FIG. 7, FIG. 7 is a lens layout and optical path diagram of a wide-angle lens assembly in accordance with a fourth embodiment of the invention. The wide-angle lens assembly 4 includes a first lens L41, a second lens L42, a stop ST4, a third lens L43, a fourth lens L44, a fifth lens L45, a sixth lens L46, and an optical filter OF4, all of which are arranged in order from an object side to an image side along an optical axis OA4. In operation, an image of light rays from the object side is formed at an image plane IMA4.

The first lens L41 is a meniscus lens with negative refractive power and made of glass material, wherein the object side surface S41 is a convex surface, the image side surface S42 is a concave surface, and both of the object side surface S41 and image side surface S42 are aspheric surfaces.

The second lens L42 is a meniscus lens with positive refractive power and made of glass material, wherein the object side surface S43 is a convex surface, the image side surface S44 is a concave surface, and both of the object side surface S43 and image side surface S44 are aspheric surfaces.

The third lens L43 is a biconvex lens with positive refractive power and made of glass material, wherein the object side surface S46 is a convex surface, the image side surface S47 is a convex surface, and both of the object side surface S46 and image side surface S47 are aspheric surfaces.

The fourth lens L44 is a meniscus lens with negative refractive power and made of glass material, wherein the object side surface S48 is a concave surface, the image side surface S49 is a convex surface, and both of the object side surface S48 and image side surface S49 are aspheric surfaces.

The fifth lens L45 is a biconvex lens with positive refractive power and made of glass material, wherein the object side surface S410 is a convex surface, the image side surface S411 is a convex surface, and both of the object side surface S410 and image side surface S411 are aspheric surfaces.

The sixth lens L46 is a meniscus lens with negative refractive power and made of glass material, wherein the object side surface S412 is a concave surface, the image side surface S413 is a convex surface and doesn't include an inflection point, and both of the object side surface S412 and image side surface S413 are aspheric surfaces.

Both of the object side surface S414 and image side surface S415 of the optical filter OF4 are plane surfaces.

In order to maintain excellent optical performance of the wide-angle lens assembly in accordance with the fourth embodiment of the invention, the wide-angle lens assembly 4 satisfies at least one of the following conditions:

$$-1.5 < f4_5/f4_1 < -0.5 \qquad (22)$$

$$0 \text{ mm} \leq f4_1 + f4_2 < 7 \text{ mm} \qquad (23)$$

$$-6 \text{ mm} \leq f4_3 + f4_4 < 1 \text{ mm} \qquad (24)$$

$$-1 < (R4_{31} + R4_{32})/(R4_{41} + R4_{42}) < 5 \qquad (25)$$

$$0.5 < SL4/TTL4 < 1.0 \qquad (26)$$

The definition of TTL4, $f4_1$, $f4_2$, $f4_3$, $f4_4$, $f4_5$, $R4_{31}$, $R4_{32}$, $R4_{41}$, $R4_{42}$ and SL4 are the same as that of TTL1, $f1_1$, $f1_2$, $f1_3$, $f1_4$, $f1_5$, $R1_{31}$, $R1_{32}$, $R1_{41}$, $R1_{42}$ and SL1 in the first embodiment, and is not described here again.

By the above design of the lenses, stop ST4, and satisfies at least one of the conditions (22)-(26), the wide-angle lens assembly 4 is provided with an effective shortened total lens length, an effective increased field of view, an increased resolution, and an effective corrected aberration.

In order to achieve the above purposes and effectively enhance the optical performance, the wide-angle lens assembly 4 in accordance with the fourth embodiment of the invention is provided with the optical specifications shown in Table 10, which include the effective focal length, F-number, total lens length, half field of view, radius of curvature of each lens surface, thickness between adjacent surface, refractive index of each lens, and Abbe number of each lens. Table 10 shows that the effective focal length is equal to 1.53 mm, F-number is equal to 2.4, total lens length is equal to 5.957 mm, and half field of view is equal to 62.5 degrees for the wide-angle lens assembly 4 of the fourth embodiment of the invention.

TABLE 10

Effective Focal Length = 1.53 mm F-number = 2.4
Total Lens Length = 5.957 mm Half Field of View = 62.5 Degrees

| Surface Number | Radius of Curvature (mm) | Thickness (mm) | Nd | Vd | Remark |
|---|---|---|---|---|---|
| S41 | 1.882174 | 0.357059 | 1.603274 | 60.501758 | The First Lens L41 |
| S42 | 0.6253249 | 0.6862696 | | | |
| S43 | 1.248845 | 0.3801453 | 2.001780 | 19.320000 | The Second Lens L42 |
| S44 | 1.584139 | 0.2113817 | | | |
| S45 | ∞ | 0.01928373 | | | Stop ST4 |
| S46 | 3.400625 | 0.8565181 | 1.679708 | 52.748148 | The Third Lens L43 |
| S47 | −1.422603 | 0.05770429 | | | |
| S48 | −1.190954 | 0.2845544 | 2.001780 | 19.320000 | The Fourth Lens L44 |
| S49 | −2.361417 | 0.1547862 | | | |
| S410 | 8.280282 | 0.6874895 | 1.690558 | 52.807163 | The Fifth Lens L45 |
| S411 | −1.581102 | 0.04222933 | | | |
| S412 | −5.001821 | 0.4969441 | 2.001780 | 19.320000 | The Sixth Lens L46 |
| S413 | −7.442719 | 1 | | | |
| S414 | ∞ | 0.21 | 1.523303 | 54.517200 | Optical Filter OF4 |
| S415 | ∞ | 0.5129949 | | | |

The aspheric surface sag z of each lens in table 10 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis,
k is conic constant and A, B, C and D are aspheric coefficients.

In the fourth embodiment, the conic constant k and the aspheric coefficients A, B, C, D of each surface are shown in Table 11.

TABLE 11

| Surface Number | k | A | B | C | D |
|---|---|---|---|---|---|
| S41 | −0.1776031 | −0.044089806 | 0.0050228005 | −0.0015414995 | −2.5555078E−005 |
| S42 | −0.7175237 | −0.061469875 | −0.0431641 | −0.076311014 | 0.012234342 |
| S43 | 1.107864 | −0.054375008 | 0.048194678 | 0.015845642 | 0.20499854 |
| S44 | 0 | 0.19610348 | 0.19049194 | 2.5193652 | 0 |
| S46 | 6.114674 | 0.053533071 | −0.2552108 | 0.45856207 | 0 |
| S47 | 1.659509 | −0.50700272 | −0.29631486 | 0.68660361 | 0.55107168 |
| S48 | −0.094444 | −0.10868211 | −0.37771141 | 0.089602036 | 0.43647005 |
| S49 | −6.284605 | 0.075922712 | −0.0079760103 | −0.048099836 | 0.028743477 |
| S410 | −121.6582 | −0.043962284 | 0.039207267 | −0.01005328 | 0 |
| S411 | −1.703105 | 0.075931263 | 0.0085528913 | −0.0047887133 | 0 |
| S412 | 0 | 0.0085039772 | 0.0045300155 | −0.00038385188 | −6.8393091E−005 |
| S413 | 10.47078 | −0.029667815 | 0.008765338 | −0.0010822975 | 0.00010916529 |

Table 12 shows the parameters and condition values for conditions (22)-(26). As can be seen from Table 12, the wide-angle lens assembly 4 of the fourth embodiment satisfies the conditions (22)-(26). An optimal range for the condition $f4_5/f4_1$ is $-1.411 \leq f4_5/f4_1 \leq -0.77$.

TABLE 12

| TTL4 | 5.957 mm | $f4_1$ | −1.402 mm | $f4_2$ | 3.758 mm |
|---|---|---|---|---|---|
| $f4_3$ | 1.590 mm | $f4_4$ | −2.731 mm | $f4_5$ | 1.979 mm |
| $R4_{31}$ | 3.401 mm | $R4_{32}$ | −1.423 mm | $R4_{41}$ | −1.191 mm |
| $R4_{42}$ | −2.361 mm | SL4 | 4.323 mm | | |
| $f4_5/f4_1$ | −1.411 | $f4_3 + f4_4$ | −1.141 mm | SL4/TTL4 | 0.726 |
| $(R4_{31} + R4_{32})/(R4_{41} + R4_{42})$ | −0.557 | $f4_1 + f4_2$ | 2.355 mm | | |

Figure 8A:
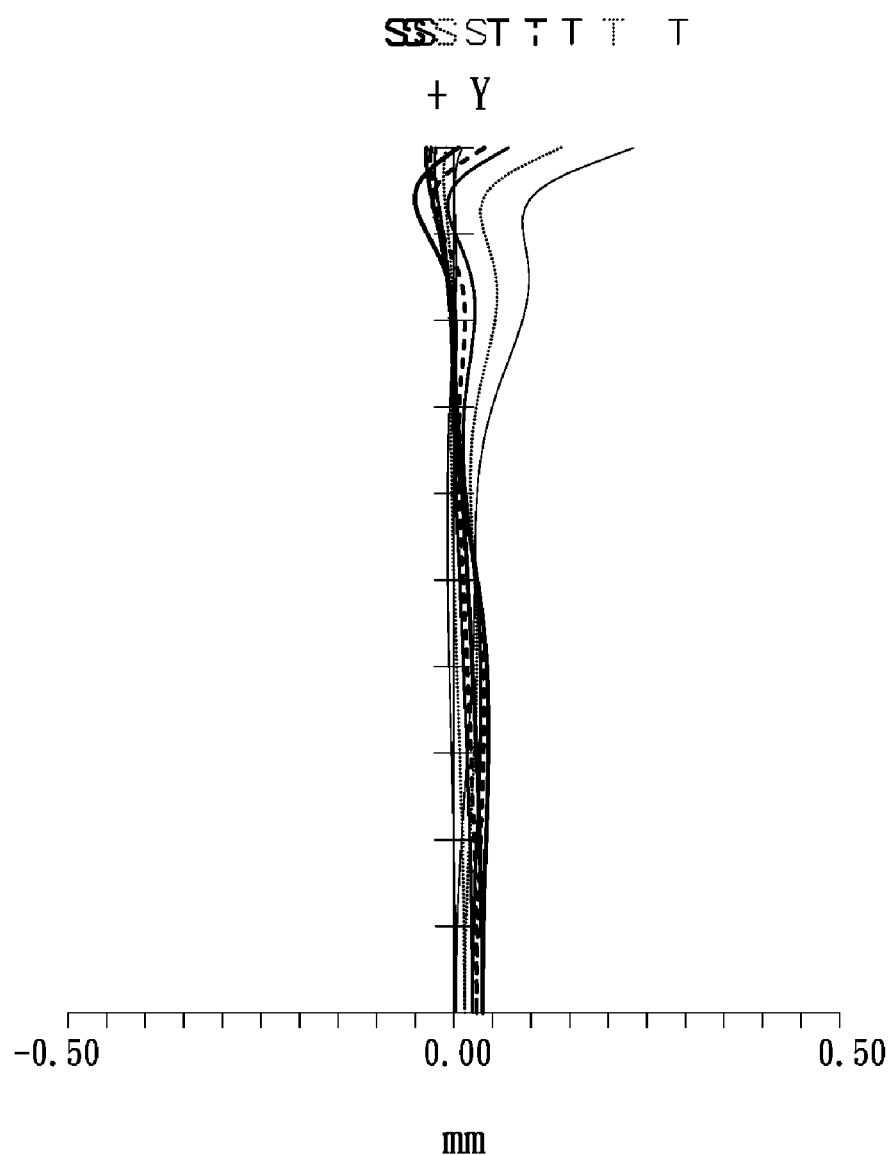
FIG. 8A depicts a field curvature diagram of the wide-angle lens assembly in accordance with the fourth embodiment of the invention.
Figure 8B:
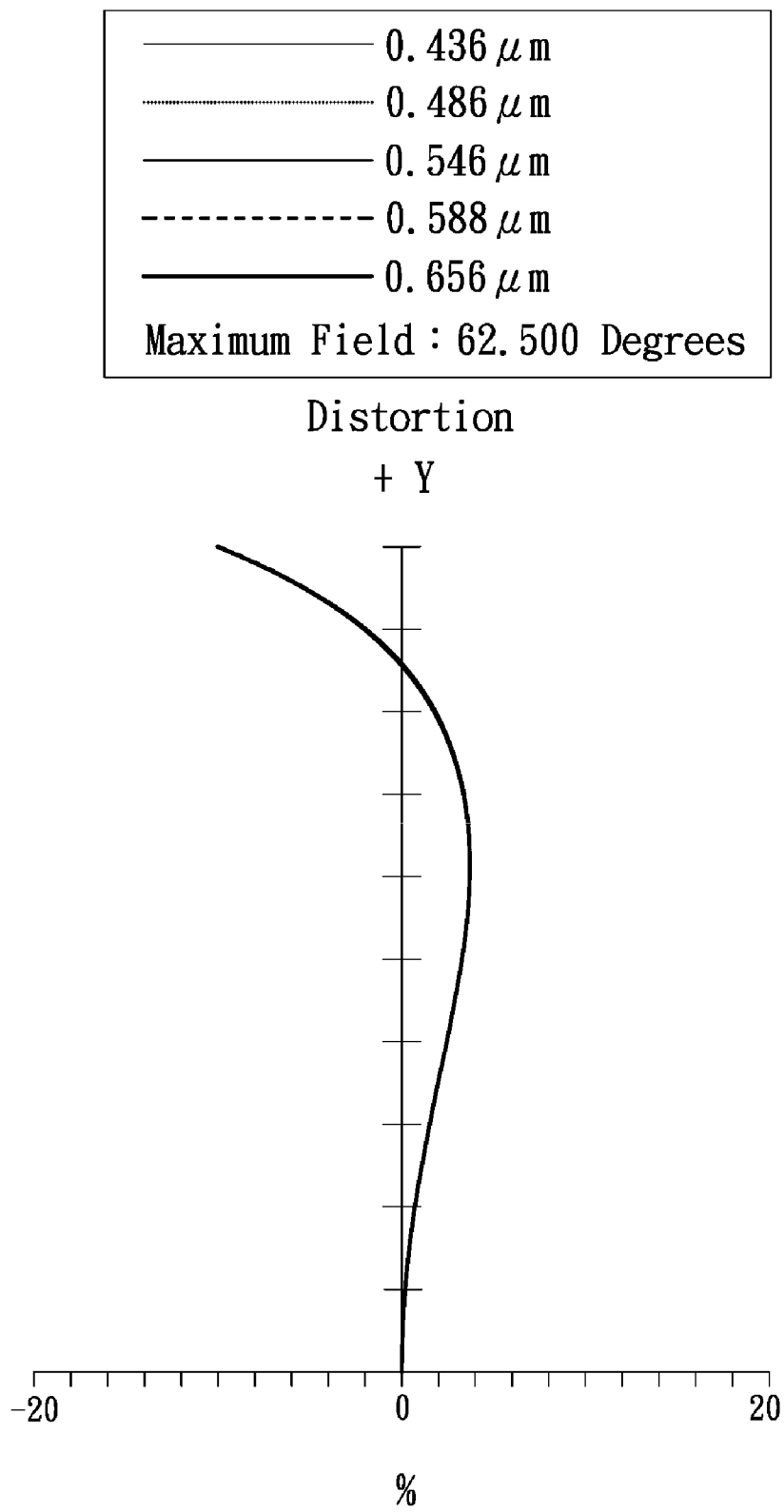
FIG. 8B is a distortion diagram of the wide-angle lens assembly in accordance with the fourth embodiment of the invention.
Figure 8C:
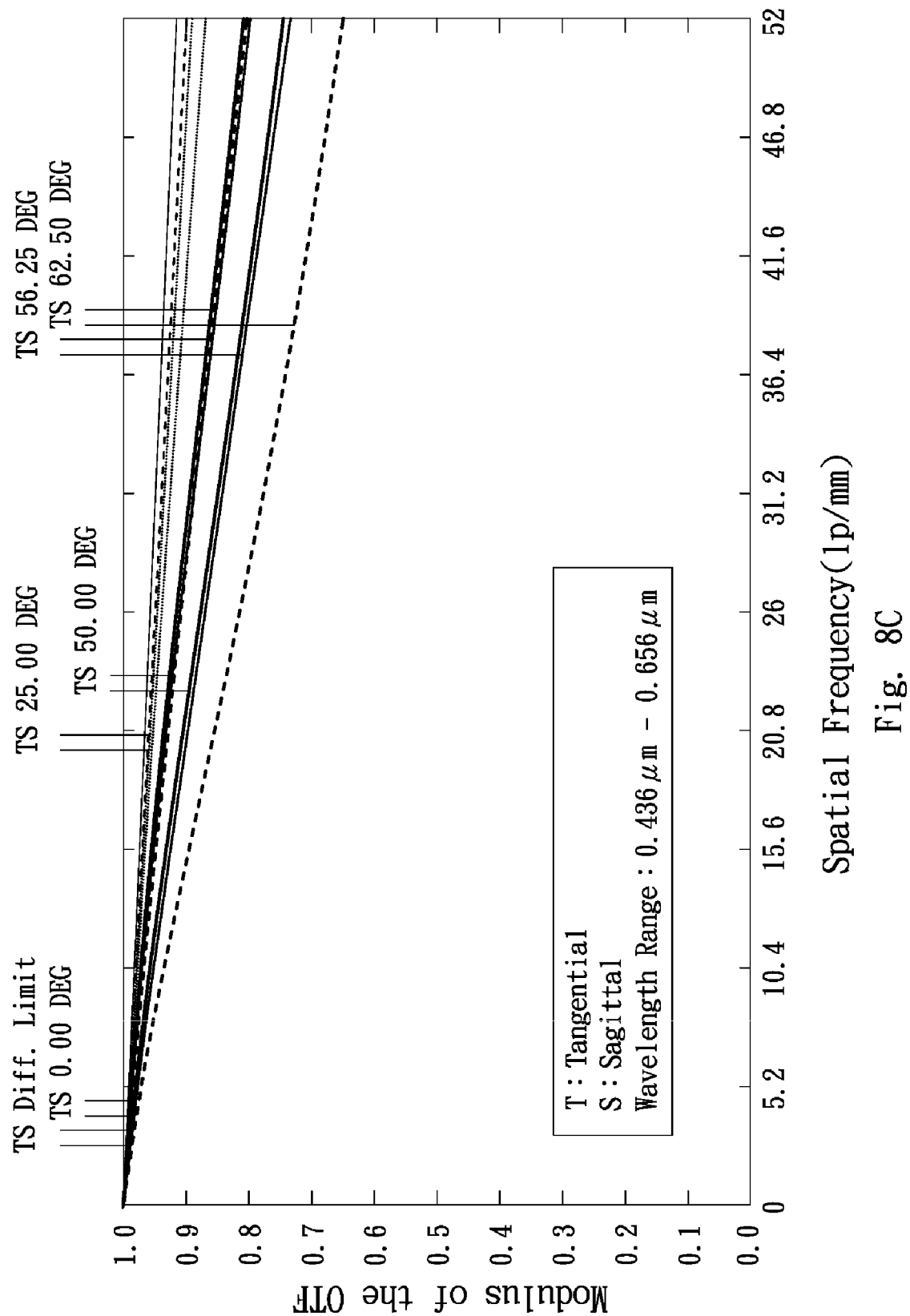
FIG. 8C is a modulation transfer function diagram of the wide-angle lens assembly in accordance with the fourth embodiment of the invention.

By the above arrangements of the lenses and stop ST4, the wide-angle lens assembly 4 of the fourth embodiment can meet the requirements of optical performance as seen in FIGS. 8A-8C, wherein FIG. 8A shows a field curvature diagram of the wide-angle lens assembly 4 in accordance with the fourth embodiment of the invention, FIG. 8B shows a distortion diagram of the wide-angle lens assembly 4 in accordance with the fourth embodiment of the invention, and FIG. 8C shows a modulation transfer function diagram of the wide-angle lens assembly 4 in accordance with the fourth embodiment of the invention.

It can be seen from FIG. 8A that the field curvature of tangential direction and sagittal direction in the wide-angle lens assembly 4 of the fourth embodiment ranges from −0.05 mm to 0.25 mm for the wavelength of 0.436 μm, 0.486 μm, 0.546 μm, 0.588 μm, and 0.656 μm.

It can be seen from FIG. 8B (in which the five lines in the figure almost coincide to appear as if a signal line) that the distortion in the wide-angle lens assembly 4 of the fourth embodiment ranges from −10% to 4% for the wavelength of 0.436 μm, 0.486 μm, 0.546 μm, 0.588 μm, and 0.656 μm.

It can be seen from FIG. 8C that the modulation transfer function of tangential direction and sagittal direction in the wide-angle lens assembly 4 of the fourth embodiment ranges from 0.65 to 1.0 wherein the wavelength ranges from 0.436 μm to 0.656 μm, the fields respectively are 0.0000 degree, 25.00 degrees, 50.00 degrees, 56.25 degrees, and 62.50 degrees, and the spatial frequency ranges from 0 lp/mm to 52 lp/mm.

It is obvious that the field curvature and the distortion of the wide-angle lens assembly 4 of the fourth embodiment can be corrected effectively, and the resolution of the wide-angle lens assembly 4 of the fourth embodiment can meet the requirement. Therefore, the wide-angle lens assembly 4 of the fourth embodiment is capable of good optical performance.

Figure 9:
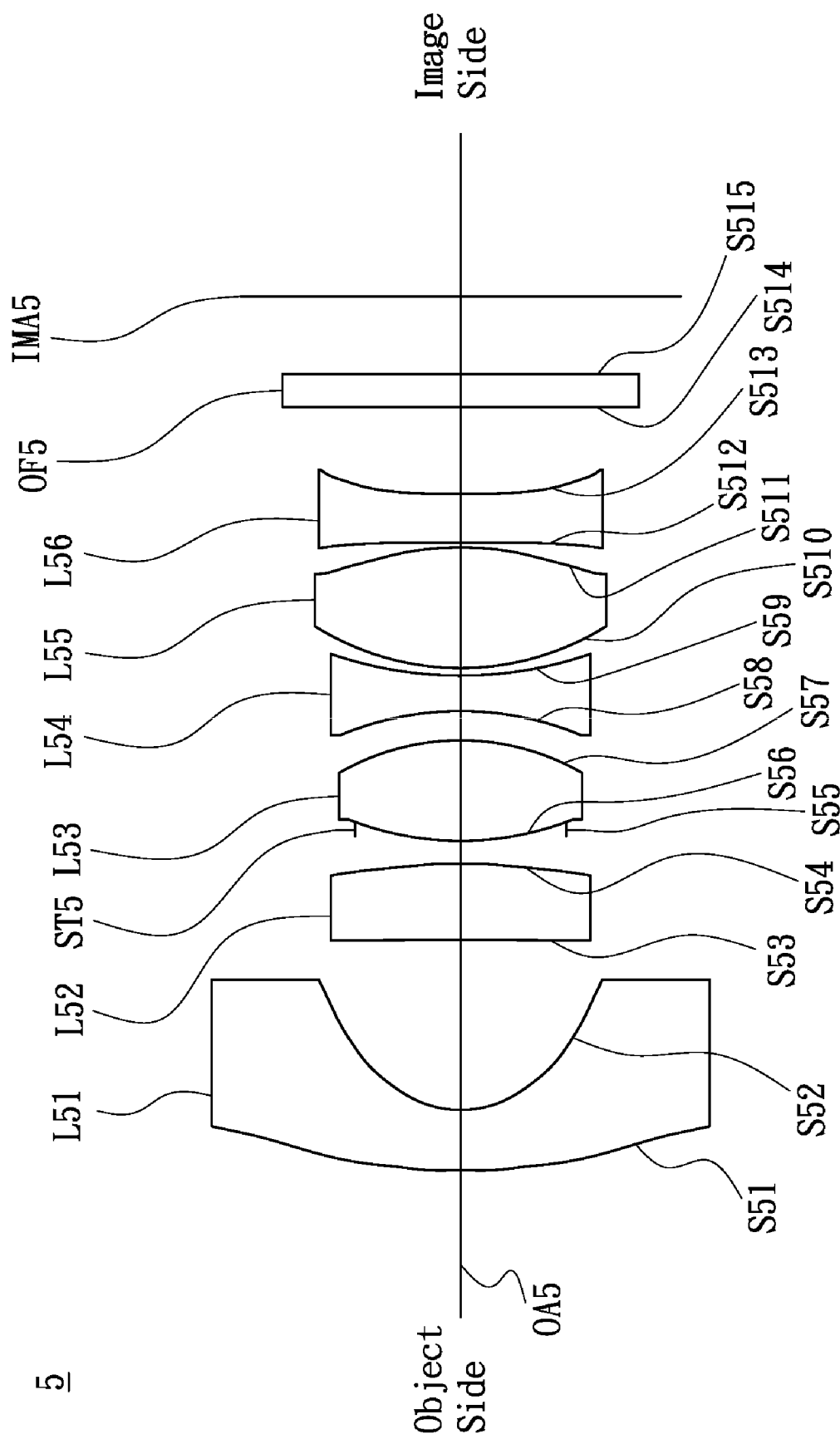
FIG. 9 is a lens layout diagram of a wide-angle lens assembly in accordance with a fifth embodiment of the invention.

Referring to FIG. 9, FIG. 9 is a lens layout diagram of a wide-angle lens assembly in accordance with a fifth embodiment of the invention. The wide-angle lens assembly 5 includes a first lens L51, a second lens L52, a stop ST5, a third lens L53, a fourth lens L54, a fifth lens L55, a sixth lens L56, and an optical filter OF5, all of which are arranged in order from an object side to an image side along an optical axis OA5. In operation, an image of light rays from the object side is formed at an image plane IMA5.

The first lens L51 is a meniscus lens with negative refractive power and made of plastic material, wherein the object side surface S51 is a convex surface, the image side surface S52 is a concave surface, and both of the object side surface S51 and image side surface S52 are aspheric surfaces.

The second lens L52 is a biconvex lens with positive refractive power and made of plastic material, wherein the object side surface S53 is a convex surface, the image side surface S54 is a convex surface, and both of the object side surface S53 and image side surface S54 are aspheric surfaces.

The third lens L53 is a biconvex lens with positive refractive power and made of plastic material, wherein the object side surface S56 is a convex surface, the image side surface S57 is a convex surface, and both of the object side surface S56 and image side surface S57 are aspheric surfaces.

The fourth lens L54 is a biconcave lens with negative refractive power and made of plastic material, wherein the object side surface S58 is a concave surface, the image side surface S59 is a concave surface, and both of the object side surface S58 and image side surface S59 are aspheric surfaces.

The fifth lens L55 is a biconvex lens with positive refractive power and made of glass material, wherein the object side surface S510 is a convex surface, the image side surface S511 is a convex surface, and both of the object side surface S510 and image side surface S511 are aspheric surfaces.

The sixth lens L56 is a meniscus lens with negative refractive power and made of plastic material, wherein the object side surface S512 is a convex surface, the image side surface S513 is a concave surface, and both of the object side surface S512 and image side surface S513 are aspheric surfaces.

Both of the object side surface S514 and image side surface S515 of the optical filter OF5 are plane surfaces.

In order to maintain excellent optical performance of the wide-angle lens assembly in accordance with the fifth embodiment of the invention, the wide-angle lens assembly 5 satisfies at least one of the following conditions:

$$-1.5 < f5_5/f5_1 < -0.5 \quad (27)$$

$$0 \text{ mm} < f5_1 + f5_2 < 7 \text{ mm} \quad (28)$$

$$-6 \text{ mm} < f5_3 + f5_4 < 1 \text{ mm} \quad (29)$$

$$0.5 < SL5/TTL5 < 1.0 \quad (30)$$

$$0.15 < BFL5/TTL5 < 0.25 \quad (31)$$

The definition of TTL5, $f5_1$, $f5_2$, $f5_3$, $f5_4$, $f5_5$, SL5 and BFL5 are the same as that of TTL1, $f1_1$, $f1_2$, $f1_3$, $f1_4$, $f1_5$, SL1 and BFL1 in the first embodiment, and is not described here again.

By the above design of the lenses, stop ST5, and satisfies at least one of the conditions (27)-(31), the wide-angle lens assembly 5 is provided with an effective shortened total lens length, an effective increased field of view, an increased resolution, and an effective corrected aberration.

In order to achieve the above purposes and effectively enhance the optical performance, the wide-angle lens assembly 5 in accordance with the fifth embodiment of the invention is provided with the optical specifications shown in Table 13, which include the effective focal length, F-number, total lens length, half field of view, radius of curvature of each lens surface, thickness between adjacent surface, refractive index of each lens, and Abbe number of each lens. Table 13 shows that the effective focal length is equal to 1.08741 mm, F-number is equal to 1.6, total lens length is equal to 5.59 mm, and half field of view is equal to 51 degrees for the wide-angle lens assembly 5 of the fifth embodiment of the invention.

TABLE 13

Effective Focal Length = 1.08741 mm F-number = 1.6
Total Lens Length = 5.59 mm Half Field of View = 51 Degrees

| Surface Number | Radius of Curvature (mm) | Thickness (mm) | Nd | Vd | Remark |
|---|---|---|---|---|---|
| S51 | 4.524013 | 0.387558 | 1.535218 | 56.11525 | The First Lens L51 |
| S52 | 0.719282 | 1.088266 | | | |
| S53 | 187.1543 | 0.487825 | 1.650958 | 21.51361 | The Second Lens L52 |
| S54 | −3.01312 | 0.214279 | | | |
| S55 | ∞ | −0.06734 | | | Stop ST5 |
| S56 | 2.453883 | 0.64491 | 1.535218 | 56.11525 | The Third Lens L53 |
| S57 | −1.34422 | 0.180414 | | | |
| S58 | −1.90457 | 0.230542 | 1.650958 | 21.51361 | The Fourth Lens L54 |
| S59 | 1.840171 | 0.050066 | | | |
| S510 | 1.531144 | 0.774579 | 1.690034 | 52.75338 | The Fifth Lens L55 |
| S511 | −1.64166 | 0.026713 | | | |
| S512 | 30.40135 | 0.312948 | 1.650958 | 21.51361 | The Sixth Lens L56 |
| S513 | 4.2967 | 0.558146 | | | |
| S514 | ∞ | 0.21 | 1.523303 | 54.5172 | Optical Filter OF5 |
| S515 | ∞ | 0.5 | | | |

The aspheric surface sag z of each lens in table 13 can be calculated by the following formula:

$$z = ch^2/\{1 + [1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the fifth embodiment, the conic constant k and the aspheric coefficients A, B, C, D, E of each surface are shown in Table 14.

TABLE 14

| Surface Number | k | A | B | C | D | E |
|---|---|---|---|---|---|---|
| S51 | 3.364453 | 0.05866153 | −0.060344983 | 0.02237891 | −0.00472581 | 0.000450006 |
| S52 | −0.80052 | 0.26180587 | 0.16054821 | −0.14311864 | 0.14350392 | −0.22425802 |
| S53 | 36832.13 | 0.018737166 | 0.003258685 | 0.019092477 | −0.14516171 | 0 |
| S54 | 0 | 0.15536951 | −0.089364183 | −0.036458763 | 0 | 0 |
| S56 | 2.745346 | 0.14338606 | −0.046635587 | −0.2030732 | 0 | 0 |
| S57 | −8.25112 | −0.12021479 | 0.11297698 | −0.36030179 | 0.18962588 | 0 |
| S58 | −7.54262 | 0.16594949 | −0.81150845 | 0.62531828 | 0.15833073 | 0 |
| S59 | −0.43653 | −0.078141084 | −0.51927135 | 0.99570601 | −0.43954674 | 0 |
| S510 | −1.78986 | −0.062217742 | −0.0376995 | 0.21949462 | −0.10804741 | 0 |
| S511 | −1.86659 | 0.1003241 | 0.058966468 | −0.24095703 | 0.20015407 | 0.00E+00 |
| S512 | 0 | −0.17714135 | 0.55961085 | −0.94384433 | 0.5242962 | 0 |
| S513 | 17.15685 | −0.11947814 | 0.42123715 | −0.38384595 | 0.12147515 | 0.00E+00 |

Table 15 shows the parameters and condition values for conditions (27)-(31). As can be seen from Table 15, the wide-angle lens assembly 5 of the fifth embodiment satisfies the conditions (27)-(31). An optimal range for the condition $f5_5/f5_1$ is $-1.411 \leq f5_5/f5_1 \leq -0.77$.

TABLE 15

| TTL5 | 5.59 mm | $f5_1$ | −1.6516 mm | $f5_2$ | 4.5226 mm |
|---|---|---|---|---|---|
| $f5_3$ | 1.7194 mm | $f5_4$ | −1.392 mm | $f5_5$ | 1.2712 mm |
| SL5 | 3.421 mm | BFL5 | 1.268146 mm | | |
| $f5_5/f5_1$ | −0.770 | $f5_3 + f5_4$ | 0.327 mm | BFL5/TTL5 | 0.227 |
| SL5/TTL4 | 0.612 | $f5_1 + f5_2$ | 2.871 mm | | |

Figure 10A:
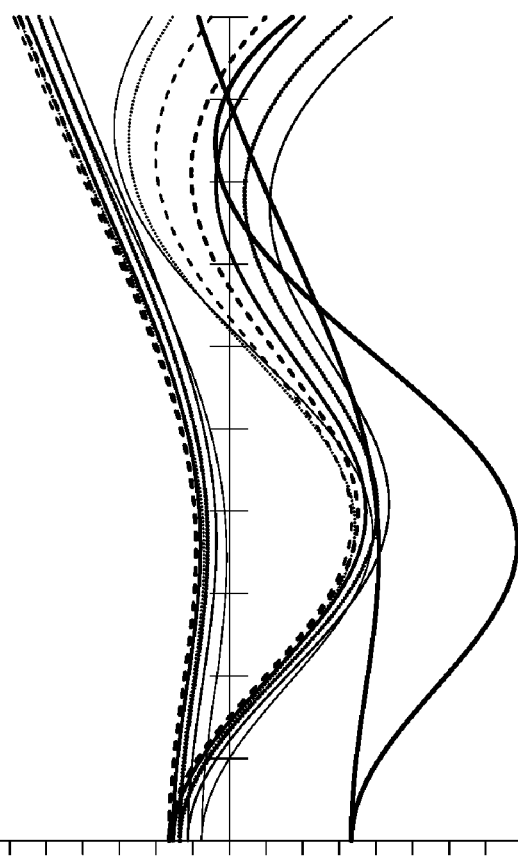
FIG. 10A depicts a field curvature diagram of the wide-angle lens assembly in accordance with the fifth embodiment of the invention.
Figure 10B:
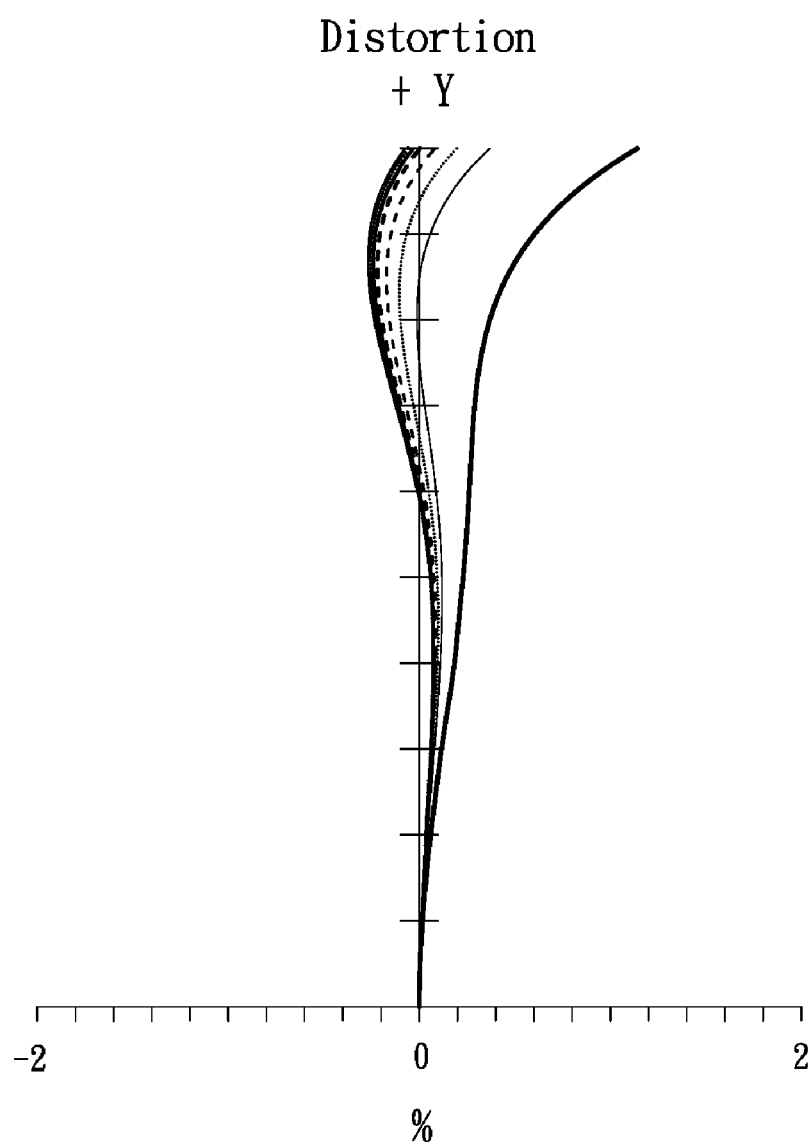
FIG. 10B is a distortion diagram of the wide-angle lens assembly in accordance with the fifth embodiment of the invention.
Figure 10C:
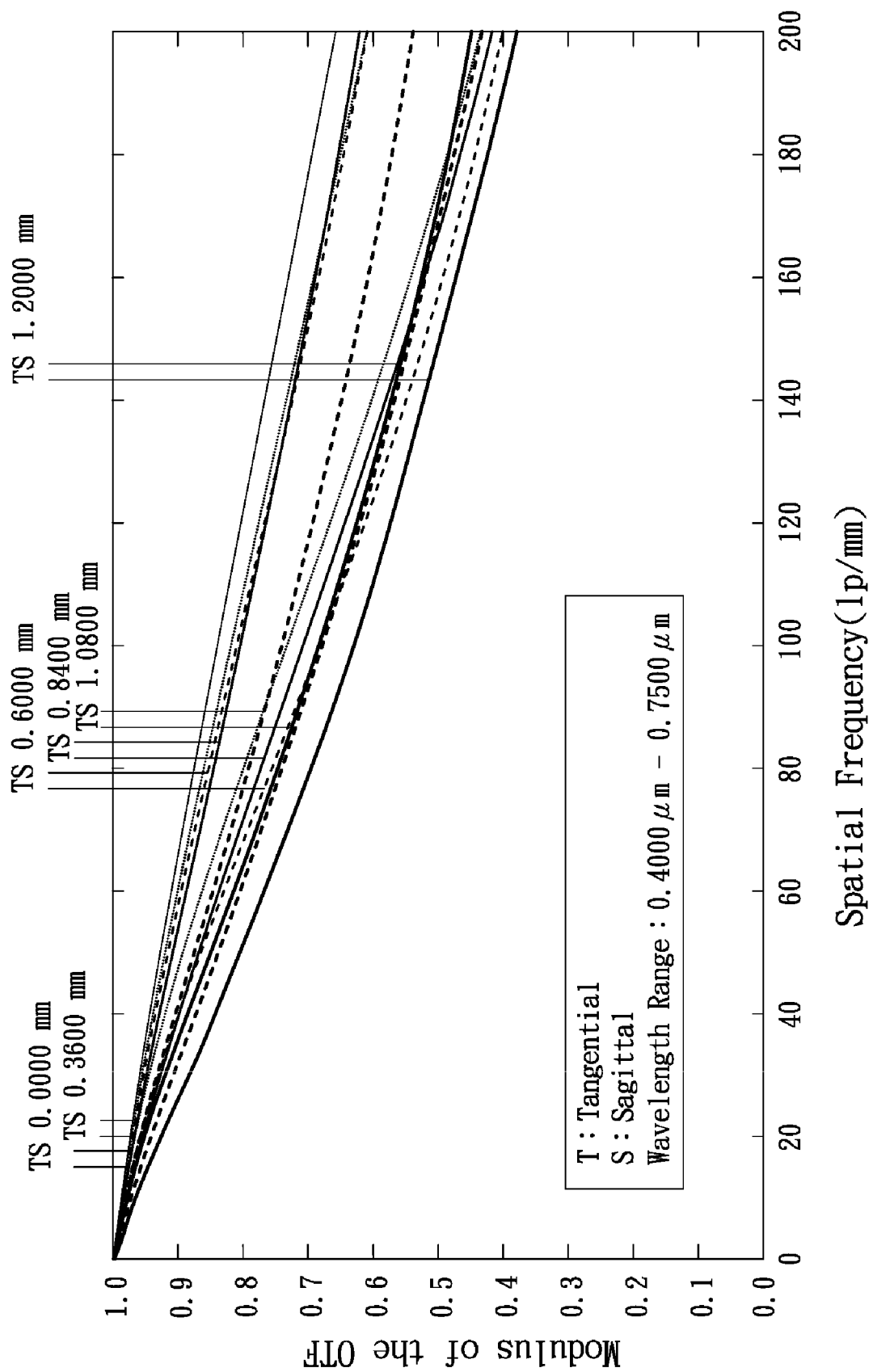
FIG. 10C is a modulation transfer function diagram of the wide-angle lens assembly in accordance with the fifth embodiment of the invention.

By the above arrangements of the lenses and stop ST5, the wide-angle lens assembly 5 of the fifth embodiment can meet the requirements of optical performance as seen in FIGS. 10A-10C, wherein FIG. 10A shows a field curvature diagram of the wide-angle lens assembly 5 in accordance with the fifth embodiment of the invention, FIG. 10B shows a distortion diagram of the wide-angle lens assembly 5 in accordance with the fifth embodiment of the invention, and FIG. 10C shows a modulation transfer function diagram of the wide-angle lens assembly 5 in accordance with the fifth embodiment of the invention.

It can be seen from FIG. 10A that the field curvature of tangential direction and sagittal direction in the wide-angle lens assembly 5 of the fifth embodiment ranges from −0.03 mm to 0.04 mm for the wavelength of 0.400 μm, 0.470 μm, 0.510 μm, 0.555 μm, 0.610 μm, 0.650 μm, 0.700 μm, and 0.750 μm.

It can be seen from FIG. 10B that the distortion in the wide-angle lens assembly 5 of the fifth embodiment ranges from −0.4% to 1.2% for the wavelength of 0.400 μm, 0.470 μm, 0.510 μm, 0.555 μm, 0.610 μm, 0.650 μm, 0.700 μm, and 0.750 μm.

It can be seen from FIG. 10C that the modulation transfer function of tangential direction and sagittal direction in the wide-angle lens assembly 5 of the fifth embodiment ranges from 0.38 to 1.0 wherein the wavelength ranges from 0.400 μm to 0.750 μm, the fields respectively are 0.0000 mm, 0.3600 mm, 0.6000 mm, 0.8400 mm, 1.0800 mm, and 1.2000 mm, and the spatial frequency ranges from 0 lp/mm to 200 lp/mm.

It is obvious that the field curvature and the distortion of the wide-angle lens assembly 5 of the fifth embodiment can be corrected effectively, and the resolution of the wide-angle lens assembly 5 of the fifth embodiment can meet the requirement. Therefore, the wide-angle lens assembly 5 of the fifth embodiment is capable of good optical performance.

Referring to Table 16, Table 17, Table 18, Table 19, Table 20, Table 21, Table 22, and Table 23, Table 16 provides optical specifications in accordance with a sixth embodiment of the invention; Table 17 provides aspheric coefficients of each surface in Table 16; Table 18 provides optical specifications in accordance with a seventh embodiment of the invention; Table 19 provides aspheric coefficients of each surface in Table 18; Table 20 provides optical specifications in accordance with an eighth embodiment of the invention; Table 21 provides aspheric coefficients of each surface in Table 20; Table 22 provides optical specifications in accordance with a ninth embodiment of the invention; Table 23 provides aspheric coefficients of each surface in Table 22.

The figure which depicts the lens layout diagram of the wide-angle lens assembly in accordance with the sixth, seventh, eighth, and ninth embodiment of the invention is similar to the figure which depicts the lens layout diagram of the wide-angle lens assembly in accordance with the fifth embodiment of the invention, thus the figure which depicts the lens layout diagram of the wide-angle lens assembly in accordance with the sixth, seventh, eighth, and ninth embodiment of the invention is omitted.

Table 16 shows that the effective focal length is equal to 1.0797 mm, F-number is equal to 1.6, total lens length is equal to 5.75 mm, and half field of view is equal to 48 degrees for the wide-angle lens assembly of the sixth embodiment of the invention.

TABLE 16

Effective Focal Length = 1.0797 mm F-number = 1.6
Total Lens Length = 5.75 mm Half Field of View = 48 Degrees

| Surface Number | Radius of Curvature (mm) | Thickness (mm) | Nd | Vd | Remark |
|---|---|---|---|---|---|
| S61 | 3.724954 | 0.2799 | 1.535218 | 56.11525 | The First Lens L61 |
| S62 | 0.699608 | 1.149379 | | | |
| S63 | 3.959501 | 0.599972 | 1.650958 | 21.51361 | The Second Lens L62 |

TABLE 16-continued

Effective Focal Length = 1.0797 mm F-number = 1.6
Total Lens Length = 5.75 mm Half Field of View = 48 Degrees

| Surface Number | Radius of Curvature (mm) | Thickness (mm) | Nd | Vd | Remark |
|---|---|---|---|---|---|
| S64 | 193.8874 | 0.377821 | | | |
| S65 | ∞ | −0.13241 | | | Stop ST6 |
| S66 | 1.686854 | 0.641133 | 1.535218 | 56.11525 | The Third Lens L63 |
| S67 | −1.64423 | 0.211023 | | | |
| S68 | −2.38082 | 0.23987 | 1.650958 | 21.51361 | The Fourth Lens L64 |
| S69 | 1.93284 | 0.062948 | | | |
| S610 | 1.623978 | 0.79783 | 1.690034 | 52.75338 | The Fifth Lens L65 |
| S611 | −1.62521 | 0.046495 | | | |
| S612 | 8.506168 | 0.369494 | 1.650958 | 21.51361 | The Sixth Lens L66 |
| S613 | 2.553454 | 0.498998 | | | |
| S614 | ∞ | 0.21 | 1.523303 | 54.5172 | Optical Filter OF6 |
| S615 | ∞ | 0.4 | | | |

The aspheric surface sag z of each lens in table 16 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis,
k is conic constant and A, B, C, D and E are aspheric coefficients.

In the sixth embodiment, the conic constant k and the aspheric coefficients A, B, C, D, E of each surface are shown in Table 17.

TABLE 17

| Surface Number | K | A | B | C | D | E |
|---|---|---|---|---|---|---|
| S61 | −1.03144 | −0.019946909 | −0.002574653 | 0.001366677 | −0.000175036 | 0 |
| S62 | −0.89342 | 0.11014747 | 0.02430981 | 0.013929317 | −0.028229134 | 0 |
| S63 | −1.92227 | −0.015791785 | 0.076855421 | −0.011834296 | 0 | 0 |
| S64 | 0 | −0.031141065 | 0.19914734 | 0.004175096 | 0 | 0 |
| S66 | −1.37891 | −0.04533896 | 0.23397817 | −0.15796687 | 0 | 0 |
| S67 | −1.94964 | 0.046628326 | −0.037486881 | −0.05340305 | 0 | 0 |
| S68 | −18.6024 | −0.000931444 | −0.10402093 | −0.1041306 | 0 | 0 |
| S69 | −11.2282 | 0.11302596 | −0.23198949 | 0.18619916 | 0 | 0 |
| S610 | −2.06735 | −0.046656101 | 0.028431744 | −0.011548874 | 0 | 0 |
| S611 | −1.34966 | 0.052548801 | 0.003226061 | −0.029510123 | 0 | 0 |
| S612 | 0 | −0.25304873 | 0.17479222 | −0.11071126 | 0.032746262 | 0 |
| S613 | −2.4215 | −0.16201927 | 0.23756308 | −0.051128264 | −0.015484369 | 0.00E+00 |

Table 18 shows that the effective focal length is equal to 1.0244 mm, F-number is equal to 1.65, total lens length is equal to 6.22 mm, and half field of view is equal to 52.5 degrees for the wide-angle lens assembly of the seventh embodiment of the invention.

TABLE 18

Effective Focal Length = 1.0244 mm F-number = 1.65
Total Lens Length = 6.22 mm Half Field of View = 52.5 Degrees

| Surface Number | Radius of Curvature (mm) | Thickness (mm) | Nd | Vd | Remark |
|---|---|---|---|---|---|
| S71 | 3.382532 | 0.41682 | 1.535218 | 56.11525 | The First Lens L71 |
| S72 | 0.684509 | 1.210751 | | | |
| S73 | 3.903262 | 1.228225 | 1.631979 | 21.5 | The Second Lens L72 |
| S74 | −95.504 | 0.18317 | | | |
| S75 | ∞ | −0.00764 | | | Stop ST7 |
| S76 | 1.396343 | 0.628157 | 1.535218 | 56.11525 | The Third Lens L73 |
| S77 | −1.64536 | 0.154811 | | | |
| S78 | −3.02744 | 0.157977 | 1.631979 | 21.5 | The Fourth Lens L74 |
| S79 | 1.984331 | 0.097671 | | | |
| S710 | 2.131563 | 0.615591 | 1.690034 | 52.75338 | The Fifth Lens L75 |
| S711 | −2.06191 | 0.094703 | | | |
| S712 | −6.48919 | 0.45598 | 1.631979 | 21.5 | The Sixth Lens L76 |
| S713 | 19.07593 | 0.473093 | | | |
| S714 | ∞ | 0.21 | 1.523303 | 54.5172 | Optical Filter OF7 |
| S715 | ∞ | 0.3 | | | |

The aspheric surface sag z of each lens in table 18 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis,
k is conic constant and A, B, C, D and E are aspheric coefficients.

In the seventh embodiment, the conic constant k and the aspheric coefficients A, B, C, D, E of each surface are shown in Table 19.

TABLE 19

| Surface Number | K | A | B | C | D | E |
|---|---|---|---|---|---|---|
| S71 | −9.73244 | 0.002402933 | −0.001379539 | 0.000207547 | 0 | 0 |
| S72 | −0.85349 | 0.063876555 | 0.03571116 | −0.00020684 | 0 | 0 |
| S73 | 4.867885 | −0.041567994 | 0.015002997 | −0.014550848 | 0 | 0 |
| S74 | 6038.831 | −0.0988572 | 0.20202594 | −0.030430681 | 0 | 0 |
| S76 | −2.10098 | −0.053413827 | 0.15023631 | −0.071715882 | 0 | 0 |
| S77 | −0.47893 | 0.008943646 | −0.026592563 | −0.020483234 | 0 | 0 |
| S78 | −24.0194 | −0.042282039 | −0.042249813 | −0.15725082 | 0 | 0 |
| S79 | −6.73803 | 0.16119583 | −0.16968794 | 0.063545486 | 0 | 0 |
| S710 | −1.28606 | −0.021737343 | 0.034506867 | −0.070480461 | 0 | 0 |
| S711 | 2.087706 | 0.025772038 | 0.065052418 | −0.047837613 | 0 | 0 |
| S712 | −34.4335 | −0.24872652 | 0.13127349 | −0.035182558 | 0 | 0 |
| S713 | 245.3055 | −0.091271187 | 0.10886297 | −0.002167017 | 0 | 0.00E+00 |

Table 20 shows that the effective focal length is equal to 1.0787 mm, F-number is equal to 1.6, total lens length is equal to 5.77 mm, and half field of view is equal to 51 degrees for the wide-angle lens assembly of the eighth embodiment of the invention.

TABLE 20

Effective Focal Length = 1.0787 mm F-number = 1.6
Total Lens Length = 5.77 mm Half Field of View = 51 Degrees

| Surface Number | Radius of Curvature (mm) | Thickness (mm) | Nd | Vd | Remark |
|---|---|---|---|---|---|
| S81 | 2.646617 | 0.297505 | 1.535218 | 56.11525 | The First Lens L81 |
| S82 | 0.615294 | 1.045613 | | | |
| S83 | 4.093272 | 0.69819 | 1.650958 | 21.51361 | The Second Lens L82 |
| S84 | −23.4825 | 0.181033 | | | |
| S85 | ∞ | −0.02103 | | | Stop ST8 |
| S86 | 1.622384 | 0.671902 | 1.535218 | 56.11525 | The Third Lens L83 |
| S87 | −1.56003 | 0.19213 | | | |
| S88 | −2.08248 | 0.239584 | 1.650958 | 21.51361 | The Fourth Lens L84 |
| S89 | 2.051802 | 0.064112 | | | |
| S810 | 1.778855 | 0.864169 | 1.690034 | 52.75338 | The Fifth Lens L85 |
| S811 | −1.77886 | 0.06284 | | | |
| S812 | 1293.641 | 0.367599 | 1.650958 | 21.51361 | The Sixth Lens L86 |
| S813 | 13.15106 | 0.497214 | | | |
| S814 | ∞ | 0.21 | 1.523303 | 54.5172 | Optical Filter OF8 |
| S815 | ∞ | 0.4 | | | |

The aspheric surface sag z of each lens in table 20 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis,
k is conic constant and A, B, C, D and E are aspheric coefficients.

In the eighth embodiment, the conic constant k and the aspheric coefficients A, B, C, D, E of each surface are shown in Table 21.

TABLE 21

| Surface Number | K | A | B | C | D | E |
|---|---|---|---|---|---|---|
| S81 | −5.20329 | −0.020890496 | −8.547E−05 | 0.000381573 | 0 | 0 |
| S82 | −0.88363 | 0.11019998 | 0.068397641 | −0.081337389 | 0 | 0 |
| S83 | 2.730225 | −0.005424443 | 0.029410171 | −0.003664276 | 0 | 0 |
| S84 | 0 | −0.067845007 | 0.19521867 | −0.029388145 | 0 | 0 |
| S86 | −2.18648 | −0.058733689 | 0.25167846 | −0.1354347 | 0 | 0 |
| S87 | −1.27429 | 0.031564678 | −0.023215176 | −0.033612758 | 0 | 0 |
| S88 | −14.6866 | −0.04813096 | −0.015556483 | −0.24700985 | 0 | 0 |
| S89 | −10.2337 | 0.16957704 | −0.25374781 | 0.14029061 | 0 | 0 |
| S810 | −1.05833 | −0.022430788 | −0.010922089 | 0.015713401 | 0 | 0 |
| S811 | −1.05833 | 0.022430788 | 0.010922089 | −0.015713401 | 0 | 0.00E+00 |
| S812 | 1822571 | −0.27177759 | 0.17454504 | −0.066384522 | 0 | 0 |
| S813 | −19.1277 | −0.16850935 | 0.19919815 | −0.036024266 | 0 | 0.00E+00 |

Table 22 shows that the effective focal length is equal to 1.079 mm, F-number is equal to 1.6, total lens length is equal to 5.75 mm, and half field of view is equal to 51 degrees for the wide-angle lens assembly of the ninth embodiment of the invention.

TABLE 22

Effective Focal Length = 1.079 mm F-number = 1.6
Total Lens Length = 5.75 mm Half Field of View = 51 Degrees

| Surface Number | Radius of Curvature (mm) | Thickness (mm) | Nd | Vd | Remark |
|---|---|---|---|---|---|
| S91 | 2.38191 | 0.299523 | 1.535218 | 56.11525 | The First Lens L91 |
| S92 | 0.589774 | 1.036786 | | | |
| S93 | 4.36202 | 0.654844 | 1.650958 | 21.51361 | The Second Lens L92 |
| S94 | −71.2856 | 0.151471 | | | |
| S95 | ∞ | 0.009673 | | | Stop ST9 |
| S96 | 1.433855 | 0.772687 | 1.535218 | 56.11525 | The Third Lens L93 |
| S97 | −1.5607 | 0.142559 | | | |
| S98 | −1.91299 | 0.23948 | 1.650958 | 21.51361 | The Fourth Lens L94 |
| S99 | 2.517628 | 0.049512 | | | |
| S910 | 1.854278 | 0.848614 | 1.690034 | 52.75338 | The Fifth Lens L95 |
| S911 | −1.85428 | 0.064973 | | | |
| S912 | −71.4383 | 0.36943 | 1.650958 | 21.51361 | The Sixth Lens L96 |
| S913 | 11.98809 | 0.502863 | | | |
| S914 | ∞ | 0.21 | 1.523303 | 54.5172 | Optical Filter OF9 |
| S915 | ∞ | 0.4 | | | |

The aspheric surface sag z of each lens in table 22 can be calculated by the following formula:

$$z = ch^2 / \{1 + [1 - (k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the ninth embodiment, the conic constant k and the aspheric coefficients A, B, C, D, E of each surface are shown in Table 23.

TABLE 23

| Surface Number | K | A | B | C | D | E |
|---|---|---|---|---|---|---|
| S91 | −5.67797 | −0.021236998 | −0.00024873 | 0.000449741 | 0 | 0 |
| S92 | −0.87933 | 0.10055289 | 0.086086021 | −0.10556388 | 0 | 0 |
| S93 | 6.916278 | 0.006643672 | 0.030193066 | 0.023172548 | 0 | 0 |
| S94 | 0 | −0.081970046 | 0.18152266 | 0.086660306 | 0 | 0 |
| S96 | −2.59988 | −0.066820711 | 0.25834805 | −0.16427571 | 0 | 0 |
| S97 | −0.56669 | 0.0084611 | −0.060853609 | −0.027662359 | 0 | 0 |
| S98 | −12.7703 | −0.072061685 | −0.063544996 | −0.25359468 | 0 | 0 |
| S99 | −12.7071 | 0.16973449 | −0.25477337 | 0.093539036 | 0 | 0 |
| S910 | −0.76722 | −0.016121617 | −0.011564181 | 0.014182496 | 0 | 0 |
| S911 | −0.76722 | 0.016121617 | 0.011564181 | −0.014182496 | 0 | 0 |
| S912 | −1203.7 | −0.31825343 | 0.15927068 | −0.089927038 | 0 | 0 |
| S913 | −88.1459 | −0.18191938 | 0.18385491 | −0.024719712 | 0 | 0.00E+00 |

The difference between the above sixth embodiment of the wide-angle lens assembly and the fifth embodiment of the wide-angle lens assembly is that the image side surface S64 of the second lens L62 is a concave surface for the sixth embodiment of the wide-angle lens assembly, however, the image side surface S54 of the second lens L52 is a convex surface for the fifth embodiment of the wide-angle lens assembly.

The difference between the above seventh embodiment of the wide-angle lens assembly and the fifth embodiment of the wide-angle lens assembly is that the object side surface S712 of the sixth lens L76 is a concave surface for the seventh embodiment of the wide-angle lens assembly, however, the object side surface S512 of the sixth lens L56 is a convex surface for the fifth embodiment of the wide-angle lens assembly.

The concave-convex structure of each lens surface for the above eighth embodiment of the wide-angle lens assembly is the same as the fifth embodiment of the wide-angle lens assembly.

The difference between the above ninth embodiment of the wide-angle lens assembly and the fifth embodiment of the wide-angle lens assembly is that the object side surface S912 of the sixth lens L96 is a concave surface for the ninth embodiment of the wide-angle lens assembly, however, the object side surface S512 of the sixth lens L56 is a convex surface for the fifth embodiment of the wide-angle lens assembly.

The above field curvature (figure is omitted) and distortion (figure is omitted) for the sixth, seventh, eighth, and ninth embodiment of the wide-angle lens assembly can be corrected effectively, and the resolution for the sixth, seventh, eighth, and ninth embodiment of the wide-angle lens assembly can meet the requirement. Therefore, the wide-angle lens assembly of the sixth, seventh, eighth, and ninth embodiment is capable of good optical performance.

Figure 11:
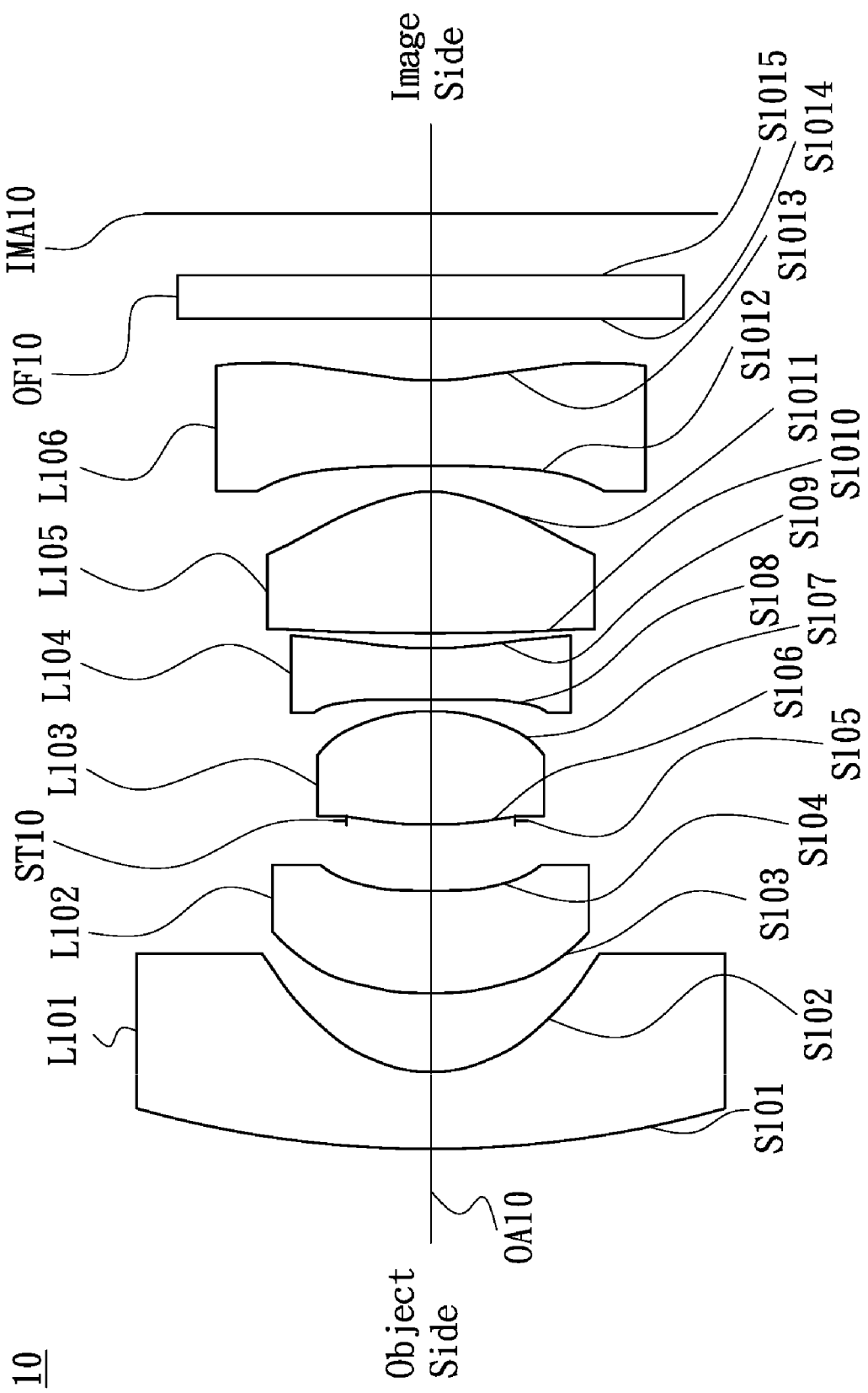
FIG. 11 is a lens layout diagram of a wide-angle lens assembly in accordance with a tenth embodiment of the invention.

Referring to FIG. 11, FIG. 11 is a lens layout diagram of a wide-angle lens assembly in accordance with a tenth embodiment of the invention. The wide-angle lens assembly 10 includes a first lens L101, a second lens L102, a stop ST10, a third lens L103, a fourth lens L104, a fifth lens L105, a sixth lens L106, and an optical filter OF10, all of which are arranged in order from an object side to an image side along an optical axis OA10. In operation, an image of light rays from the object side is formed at an image plane IMA10.

The first lens L101 is a meniscus lens with negative refractive power and made of plastic material, wherein the object side surface S101 is a convex surface, the image side surface S102 is a concave surface, and both of the object side surface S101 and image side surface S102 are aspheric surfaces.

The second lens L102 is a meniscus lens with positive refractive power and made of plastic material, wherein the object side surface S103 is a convex surface, the image side surface S104 is a concave surface, and both of the object side surface S103 and image side surface S104 are aspheric surfaces.

The third lens L103 is a biconvex lens with positive refractive power and made of plastic material, wherein the object side surface S106 is a convex surface, the image side surface S107 is a convex surface, and both of the object side surface S106 and image side surface S107 are aspheric surfaces.

The fourth lens L104 is a meniscus lens with negative refractive power and made of plastic material, wherein the object side surface S108 is a convex surface, the image side surface S109 is a concave surface, and both of the object side surface S108 and image side surface S109 are aspheric surfaces.

The fifth lens L105 is a meniscus lens with positive refractive power and made of glass material, wherein the object side surface S1010 is a concave surface, the image side surface S1011 is a convex surface, and both of the object side surface S1010 and image side surface S1011 are aspheric surfaces.

The sixth lens L106 is a biconcave lens with negative refractive power and made of plastic material, wherein the object side surface S1012 is a concave surface, the image side surface S1013 is a concave surface, and both of the object side surface S1012 and image side surface S1013 are aspheric surfaces.

Both of the object side surface S1014 and image side surface S1015 of the optical filter OF10 are plane surfaces.

In order to maintain excellent optical performance of the wide-angle lens assembly in accordance with the tenth embodiment of the invention, the wide-angle lens assembly 10 satisfies at least one of the following conditions:

$$-1.5 < f10_1/f10_1 < -0.5 \quad (32)$$

$$0 \text{ mm} < f10_1 + f10_2 < 7 \text{ mm} \quad (33)$$

$$-6 \text{ mm} < f10_3 + f10_4 < 1 \text{ mm} \quad (34)$$

$$0.5 < SL10/TTL10 < 1.0 \quad (35)$$

$$0.15 < BFL10/TTL10 < 0.25 \quad (36)$$

The definition of TTL10, $f10_1$, $f10_2$, $f10_3$, $f10_4$, $f10_5$, SL10 and BFL10 are the same as that of TTL1, $f1_1$, $f1_2$, $f1_3$, $f1_4$, $f1_5$, SL1 and BFL1 in the first embodiment, and is not described here again.

By the above design of the lenses, stop ST10, and satisfies at least one of the conditions (32)-(36), the wide-angle lens assembly 10 is provided with an effective shortened total lens length, an effective increased field of view, an increased resolution, and an effective corrected aberration.

In order to achieve the above purposes and effectively enhance the optical performance, the wide-angle lens assembly 10 in accordance with the tenth embodiment of the invention is provided with the optical specifications shown in Table 24, which include the effective focal length, F-number, total lens length, half field of view, radius of curvature of each lens surface, thickness between adjacent surface, refractive index of each lens, and Abbe number of each lens. Table 24 shows that the effective focal length is equal to 1.0785 mm, F-number is equal to 2.05, total lens length is equal to 4.56 mm, and half field of view is equal to 51 degrees for the wide-angle lens assembly 10 of the tenth embodiment of the invention.

TABLE 24

Effective Focal Length = 1.0785 mm F-number = 2.05
Total Lens Length = 4.56 mm Half Field of View = 51 Degrees

| Surface Number | Radius of Curvature (mm) | Thickness (mm) | Nd | Vd | Remark |
|---|---|---|---|---|---|
| S101 | 5.445653 | 0.376507 | 1.543915 | 55.9512 | The First Lens L101 |
| S102 | 0.634741 | 0.385529 | | | |
| S103 | 1.37908 | 0.500894 | 1.650958 | 21.51361 | The Second Lens L102 |
| S104 | 2.484808 | 0.343561 | | | |
| S105 | ∞ | −0.0206 | | | Stop ST10 |
| S106 | 2.139886 | 0.54934 | 1.543915 | 55.9512 | The Third Lens L103 |
| S107 | −0.96884 | 0.053888 | | | |
| S108 | 7.013997 | 0.254137 | 1.650958 | 21.51361 | The Fourth Lens L104 |
| S109 | 1.740379 | 0.073893 | | | |
| S1010 | −31.6583 | 0.686948 | 1.549498 | 52.75338 | The Fift Lens L105 |
| S1011 | −0.683644 | 0.125694 | | | |
| S1012 | −26.7055 | 0.418247 | 1.650958 | 21.51361 | The Sixth Lens L106 |
| S1013 | 1.378168 | 0.302216 | | | |
| S1014 | ∞ | 0.21 | 1.523303 | 54.5172 | Optical Filter OF10 |
| S1015 | ∞ | 0.3 | | | |

The aspheric surface sag z of each lens in table 24 can be calculated by the following formula:

$$z = ch^2/\{1+[1-(k+1)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis,
k is conic constant and A, B, C, D, E, F and G are aspheric coefficients.

In the tenth embodiment, the conic constant k and the aspheric coefficients A, B, C, D, E, F, G of each surface are shown in Table 25.

TABLE 25

| Surface Number | k | A F | B G | C | D | E |
|---|---|---|---|---|---|---|
| S101 | −3.04211 | 0.002696728 −2.15108E−05 | −0.000341759 −2.8292E−06 | 3.68953E−05 | 0.000166981 | 6.85411E−05 |
| S102 | −0.77506 | −0.1639819 −0.37744709 | 0.13985091 0.038252731 | 0.21701879 | 0.16739784 | −0.17847394 |
| S103 | −10.2976 | 0.33575192 −0.72503289 | 0.2009346 −0.20272684 | −0.035645525 | 0.24259863 | 0.19540625 |
| S104 | 0 | 0.3783364 53.560517 | 1.6492038 −16.752397 | −0.69735512 | 0.55620283 | −10.01081 |
| S106 | 6.613736 | 0.032438953 712.23267 | −1.170722 −1824.1962 | 2.0507676 | −6.3532242 | −106.27928 |

TABLE 25-continued

| Surface Number | k | A / F | B / G | C | D | E |
|---|---|---|---|---|---|---|
| S107 | −2.45543 | −0.50577585 | −0.27692608 | −0.018397916 | −3.930186 | −10.499633 |
|  |  | 9.6375891 | −20.668346 |  |  |  |
| S108 | −2224.49 | −0.4871261 | −0.1745467 | −0.089449358 | −1.3430624 | −3.7548427 |
|  |  | −8.0235852 | −13.174034 |  |  |  |
| S109 | −29.5204 | −0.08357385 | 0.024043537 | −0.014591631 | −0.001486648 | −0.030176123 |
|  |  | −0.13220526 | −0.3106826 |  |  |  |
| S1010 | −4778.79 | 0.068775561 | 0.061379113 | 0.00487382 | −0.00772585 | 0.014563932 |
|  |  | 7.28E−02 | 0.15929859 |  |  |  |
| S1011 | −2.70499 | −3.22537E−05 | 0.070189348 | 0.021553705 | −0.005918168 | −1.46E−02 |
|  |  | −2.21E−02 | −0.004505431 |  |  |  |
| S1012 | 950.2842 | −0.14737351 | −0.072091504 | −0.006925541 | 0.007438255 | 0.005622008 |
|  |  | 5.15E−03 | −1.60E−03 |  |  |  |
| S1013 | −18.3489 | −0.13890534 | 0.045960435 | −0.011418095 | 0.001184465 | 1.47E−03 |
|  |  | 9.18E−04 | 5.21E−04 |  |  |  |

Table 26 shows the parameters and condition values for conditions (32)-(36). As can be seen from Table 26, the wide-angle lens assembly 10 of the tenth embodiment satisfies the conditions (32)-(36).

TABLE 26

| TTL10 | 4.56 mm | f10$_1$ | −1.353 mm | f10$_2$ | 4.01 mm |
| f10$_3$ | 1.302 mm | f10$_4$ | −3.595 mm | f10$_5$ | 1.257 mm |
| SL10 | 2.95 mm | BFL10 | 0.812216 mm |  |  |
| f10$_5$/f10$_1$ | −0.929 | f10$_3$ + f10$_4$ | −2.293 mm | BFL10/TTL10 | 0.178 |
| SL10/TTL10 | 0.647 | f10$_1$ + f10$_2$ | 2.657 mm |  |  |

Figure 12A:
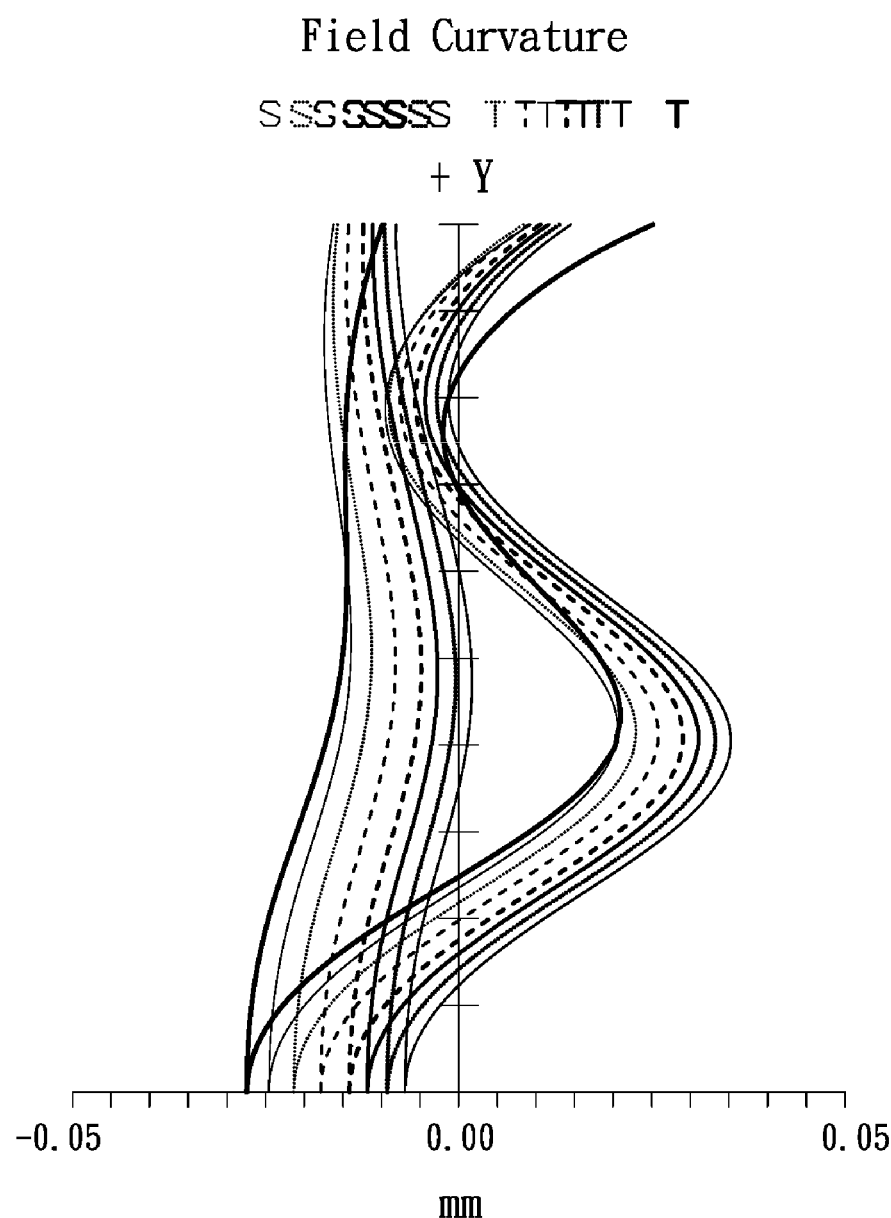
FIG. 12A depicts a field curvature diagram of the wide-angle lens assembly in accordance with the tenth embodiment of the invention.
Figure 12B:
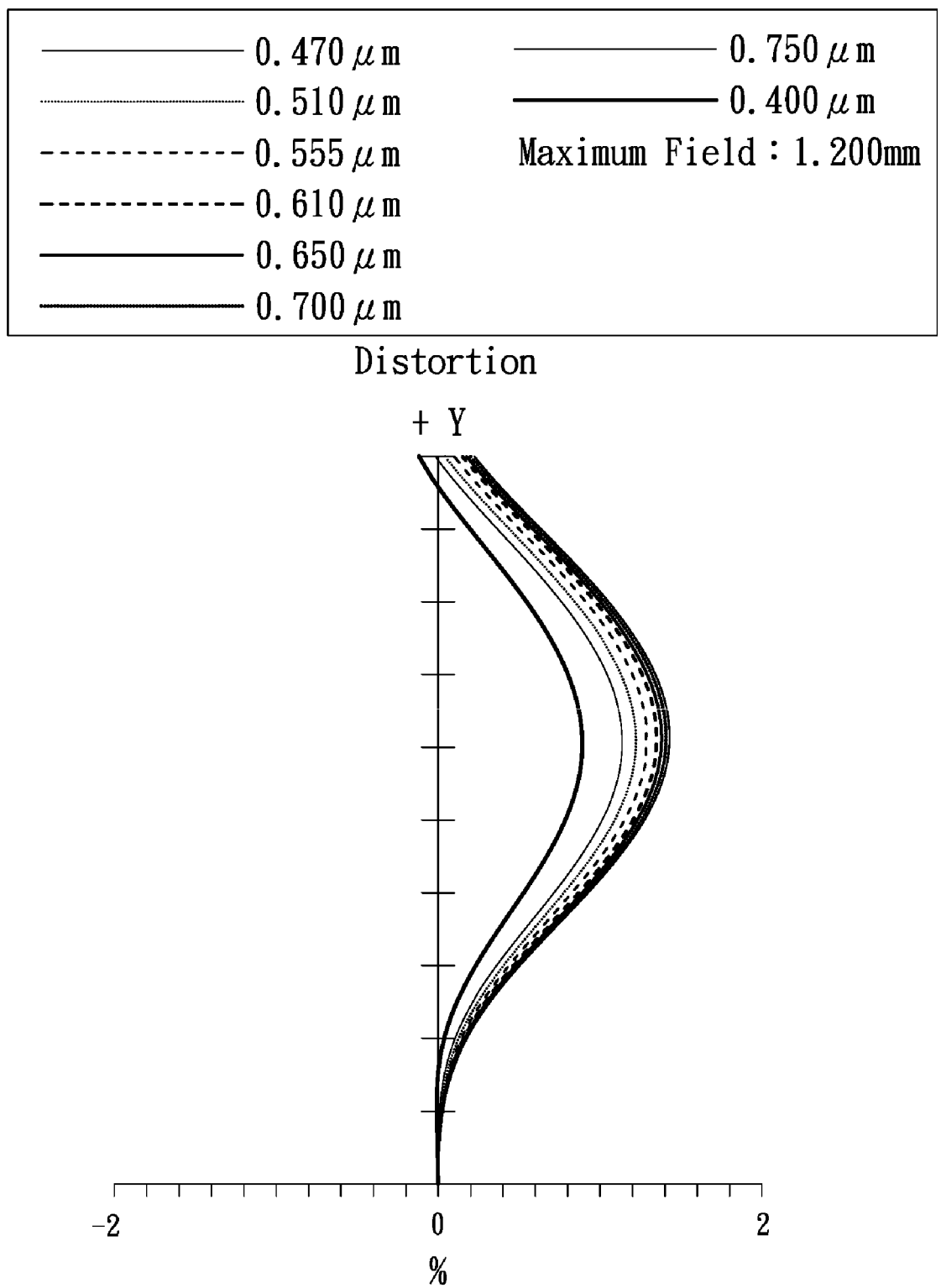
FIG. 12B is a distortion diagram of the wide-angle lens assembly in accordance with the tenth embodiment of the invention.
Figure 12C:
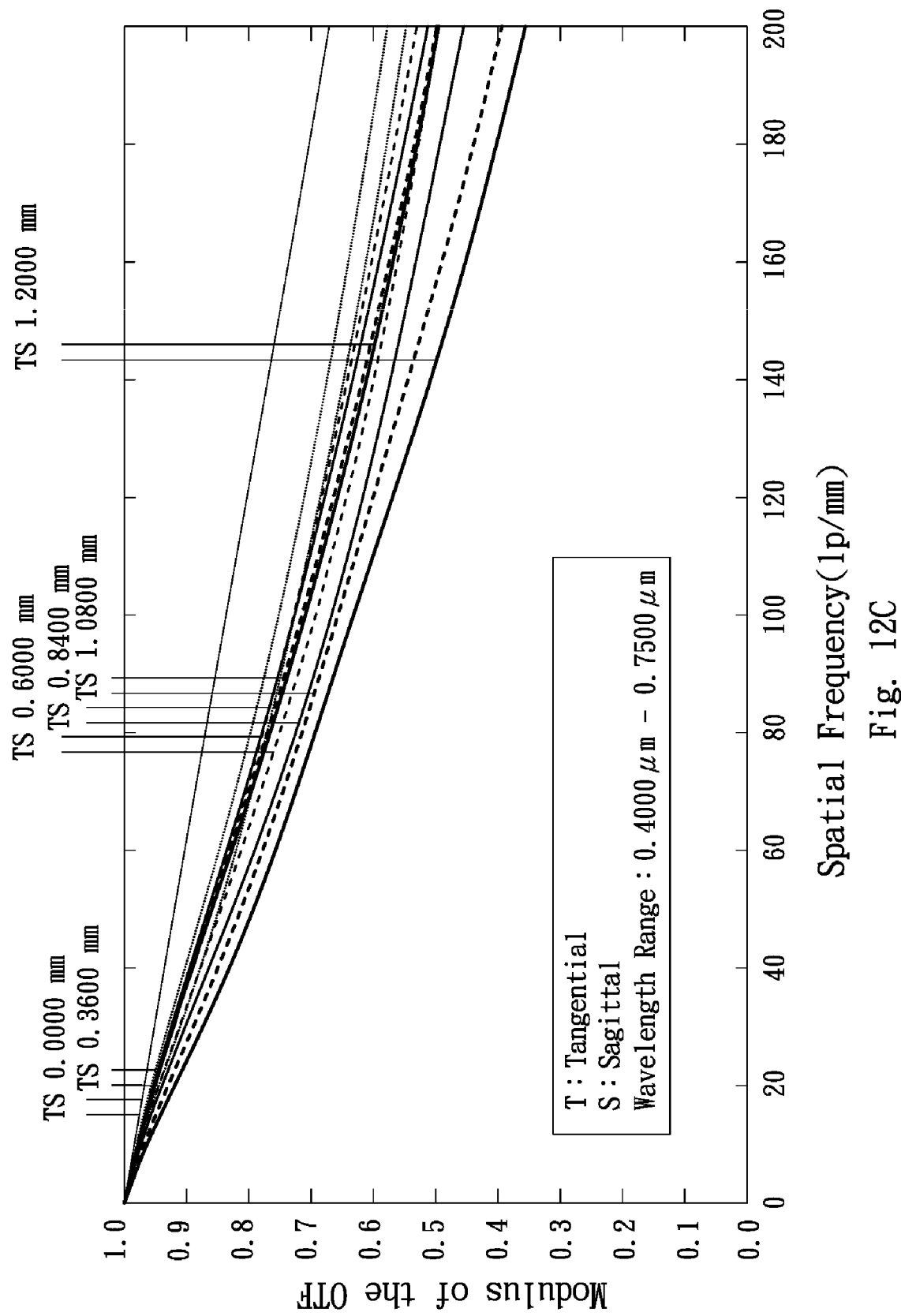
FIG. 12C is a modulation transfer function diagram of the wide-angle lens assembly in accordance with the tenth embodiment of the invention.

By the above arrangements of the lenses and stop ST10, the wide-angle lens assembly 10 of the tenth embodiment can meet the requirements of optical performance as seen in FIGS. 12A-12C, wherein FIG. 12A shows a field curvature diagram of the wide-angle lens assembly 10 in accordance with the tenth embodiment of the invention, FIG. 12B shows a distortion diagram of the wide-angle lens assembly 10 in accordance with the tenth embodiment of the invention, and FIG. 12C shows a modulation transfer function diagram of the wide-angle lens assembly 10 in accordance with the tenth embodiment of the invention.

It can be seen from FIG. 12A that the field curvature of tangential direction and sagittal direction in the wide-angle lens assembly 10 of the tenth embodiment ranges from −0.03 mm to 0.035 mm for the wavelength of 0.400 µm, 0.470 µm, 0.510 µm, 0.555 µm, 0.610 µm, 0.650 µm, 0.700 µm, and 0.750 µm.

It can be seen from FIG. 12B that the distortion in the wide-angle lens assembly 10 of the tenth embodiment ranges from −0.2% to 1.4% for the wavelength of 0.400 µm, 0.470 µm, 0.510 µm, 0.555 µm, 0.610 µm, 0.650 µm, 0.700 µm, and 0.750 µm.

It can be seen from FIG. 12C that the modulation transfer function of tangential direction and sagittal direction in the wide-angle lens assembly 10 of the tenth embodiment ranges from 0.36 to 1.0 wherein the wavelength ranges from 0.400 µm to 0.750 µm, the fields respectively are 0.0000 mm, 0.3600 mm, 0.6000 mm, 0.8400 mm, 1.0800 mm, and 1.2000 mm, and the spatial frequency ranges from 0 lp/mm to 200 lp/mm.

It is obvious that the field curvature and the distortion of the wide-angle lens assembly 10 of the tenth embodiment can be corrected effectively, and the resolution of the wide-angle lens assembly 10 of the tenth embodiment can meet the requirement. Therefore, the wide-angle lens assembly 10 of the tenth embodiment is capable of good optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly comprising:
   a first lens which is with negative refractive power and comprises a convex surface facing an object side and a concave surface facing an image side;
   a second lens which is with positive refractive power;
   a third lens which is with positive refractive power and comprises a convex surface facing the object side;
   a fourth lens which is with negative refractive power;
   a fifth lens which is with positive refractive power and comprises a convex surface facing the image side and another convex surface facing the object side; and
   a sixth lens which is a meniscus lens with negative refractive power;
   wherein the first lens, the second lens, the third lens, the fourth lens, the fifth lens, and the sixth lens are arranged in order from the object side to the image side along an optical axis;
   wherein the wide-angle lens assembly satisfies:

$-1.5 < f_5/f_1 \leq -0.77$, wherein $f_1$ is an effective focal length of the first lens and $f_5$ is an effective focal length of the fifth lens.

2. The wide-angle lens assembly as claimed in claim 1, wherein the second lens comprises a concave surface facing the object side and a convex surface facing the image side, the third lens further comprises a convex surface facing the image side, the fourth lens comprises a convex surface facing the object side and a concave surface facing the image side, and the sixth lens comprises a convex surface facing the object side and a concave surface facing the image side.

3. The wide-angle lens assembly as claimed in claim 2, wherein the concave surface of the sixth lens further comprises an inflection point.

4. The wide-angle lens assembly as claimed in claim 1, wherein the second lens comprises a convex surface facing the object side and a concave surface facing the image side, the third lens further comprises a convex surface facing the image side, the fourth lens comprises a concave surface facing the object side and a convex surface facing the image side, and the sixth lens comprises a concave surface facing the object side and a convex surface facing the image side.

5. The wide-angle lens assembly as claimed in claim 4, wherein the convex surface of the sixth lens doesn't comprise an inflection point.

6. The wide-angle lens assembly as claimed in claim 1, wherein the second lens comprises a convex surface facing the object side, the fourth lens comprises a concave surface facing the image side, and the sixth lens comprises a concave surface facing the image side.

7. The wide-angle lens assembly as claimed in claim 1, wherein the wide-angle lens assembly satisfies:

$$0 \text{ mm} < f_1 + f_2 < 7 \text{ mm},$$

wherein $f_1$ is an effective focal length of the first lens and $f_2$ is an effective focal length of the second lens.

8. The wide-angle lens assembly as claimed in claim 7, wherein the wide-angle lens assembly satisfies:

$$0.6 < f/f_2 < 0.85,$$

wherein f is an effective focal length of the wide-angle lens assembly and $f_2$ is an effective focal length of the second lens.

9. The wide-angle lens assembly as claimed in claim 1, wherein the wide-angle lens assembly satisfies:

$$-6 \text{ mm} < f_3 + f_4 < 1 \text{ mm},$$

wherein $f_3$ is an effective focal length of the third lens and $f_4$ is an effective focal length of the fourth lens.

10. The wide-angle lens assembly as claimed in claim 1, wherein the wide-angle lens assembly satisfies:

$$1 < (R_{31} + R_{32})/(R_{41} + R_{42}) < 5,$$

wherein $R_{31}$ is a radius of curvature of an object side surface of the third lens, $R_{32}$ is a radius of curvature of an image side surface of the third lens, $R_{41}$ is a radius of curvature of an object side surface of the fourth lens, and $R_{42}$ is a radius of curvature of an image side surface of the fourth lens.

11. A wide-angle lens assembly comprising:
a first lens which is with negative refractive power and comprises a convex surface facing an object side and a concave surface facing an image side;
a second lens which is with positive refractive power;
a stop;
a third lens which is with positive refractive power and comprises a convex surface facing the object side;
a fourth lens which is with negative refractive power;
a fifth lens which is with positive refractive power and comprises a convex surface facing the image side and another convex surface facing the object side; and
a sixth lens which is with negative refractive power and comprises a concave surface facing the object side;
wherein the first lens, the second lens, the stop, the third lens, the fourth lens, the fifth lens, and the sixth lens are arranged in order from the object side to the image side along an optical axis;
wherein the wide-angle lens assembly satisfies:

$$-1.5 < f_5/f_1 \le -0.77,$$

wherein $f_1$ is an effective focal length of the first lens and $f_5$ is an effective focal length of the fifth lens.

12. The wide-angle lens assembly as claimed in claim 11, wherein the second lens comprises a convex surface facing the object side, the fourth lens comprises a concave surface facing the image side, and the sixth lens comprises a concave surface facing the image side.

13. The wide-angle lens assembly as claimed in claim 11, wherein the wide-angle lens assembly satisfies:

$$0.5 < SL/TTL < 1.0,$$

wherein SL is an interval from the stop to an image plane along the optical axis and TTL is an interval from the convex surface of the first lens to the image plane along the optical axis.

14. The wide-angle lens assembly as claimed in claim 11, wherein the wide-angle lens assembly satisfies:

$$0.15 < BFL/TTL < 0.25,$$

wherein BFL is an interval from an image side surface of the sixth lens to an image plane along the optical axis and TTL is an interval from the convex surface of the first lens to the image plane along the optical axis.

15. A wide-angle lens assembly comprising:
a first lens which is with negative refractive power and comprises a convex surface facing an object side and a concave surface facing an image side;
a second lens which is a meniscus lens with positive refractive power;
a third lens which is with positive refractive power and comprises a convex surface facing the object side;
a fourth lens which is with negative refractive power;
a fifth lens which is with positive refractive power and comprises a convex surface facing the image side; and
a sixth lens which is with negative refractive power;
wherein the first lens, the second lens, the third lens, the fourth lens, the fifth lens, and the sixth lens are arranged in order from the object side to the image side along an optical axis;
wherein the wide-angle lens assembly satisfies:

$$0.4 < f/f_2 < 0.85,$$

wherein f is an effective focal length of the wide-angle lens assembly and $f_2$ is an effective focal length of the second lens.

16. The wide-angle lens assembly as claimed in claim 15, wherein the second lens comprises a concave surface facing the object side and a convex surface facing the image side, the third lens further comprises a convex surface facing the image side, the fourth lens comprises a convex surface facing the object side and a concave surface facing the image side, the fifth lens further comprises a convex surface facing the object side, and the sixth lens comprises a convex surface facing the object side and a concave surface facing the image side.

17. The wide-angle lens assembly as claimed in claim 16, wherein at least one of the convex surface and the concave surface of the sixth lens comprises an inflection point.

18. The wide-angle lens assembly as claimed in claim 15, wherein the wide-angle lens assembly satisfies:

$$1 < (R_{31} + R_{32})/(R_{41} + R_{42}) < 5,$$

wherein $R_{31}$ is a radius of curvature of an object side surface of the third lens, $R_{32}$ is a radius of curvature of an image side surface of the third lens, $R_{41}$ is a radius of curvature of an object side surface of the fourth lens, and $R_{42}$ is a radius of curvature of an image side surface of the fourth lens.

19. The wide-angle lens assembly as claimed in claim 15, wherein the wide-angle lens assembly satisfies:

$$0.15 < BFL/TTL < 0.25,$$

wherein BFL is an interval from an image side surface of the sixth lens to an image plane along the optical axis and TTL is an interval from the convex surface of the first lens to the image plane along the optical axis.

20. The wide-angle lens assembly as claimed in claim 15, further comprising a stop disposed between the second lens and the third lens, wherein the wide-angle lens assembly satisfies:

$$0 \text{ mm} < +f_2 < 7 \text{ mm},$$

$$-6 \text{ mm} < f_3 + f_4 < 1 \text{ mm},$$

$$-1.5 < f_5/f_i < -0.5,$$

$$0.5 < SL/TTL < 1.0,$$

wherein $f_1$ is an effective focal length of the first lens, $f_2$ is an effective focal length of the second lens, $f_3$ is an effective focal length of the third lens, $f_4$ is an effective focal length of the fourth lens, $f_5$ is an effective focal length of the fifth lens, SL is an interval from the stop to an image plane along the optical axis, and TTL is an interval from the convex surface of the first lens to the image plane along the optical axis.

21. A wide-angle lens assembly comprising:
a first lens which is with negative refractive power and comprises a convex surface facing an object side and a concave surface facing an image side;
a second lens which is a meniscus lens with positive refractive power;
a third lens which is with positive refractive power and comprises a convex surface facing the object side;
a fourth lens which is with negative refractive power;
a fifth lens which is with positive refractive power and comprises a convex surface facing the image side and another convex surface facing the object side; and
a sixth lens which is with negative refractive power;
wherein the first lens, the second lens, the third lens, the fourth lens, the fifth lens, and the sixth lens are arranged in order from the object side to the image side along an optical axis;
wherein the wide-angle lens assembly satisfies:

$$-1.5 < f_5/f_1 \leq -0.77,$$

wherein $f_1$ is an effective focal length of the first lens and $f_5$ is an effective focal length of the fifth lens.

* * * * *